(12) United States Patent  
Foreman et al.

(10) Patent No.: US 8,838,695 B2  
(45) Date of Patent: Sep. 16, 2014

(54) HYDROCARBON WELL INFORMATION PORTAL

(75) Inventors: Rusty Foreman, Houston, TX (US); Randy Gingera, Katy, TX (US); Gloria Lazaro, Katy, TX (US); Cynthia Lee, Austin, TX (US); Ramakrishna Manne, Missouri City, TX (US)

(73) Assignee: BP Corporation North America Inc., Houston, TX (US)

( * ) Notice: Subject to any disclaimer, the term of this patent is extended or adjusted under 35 U.S.C. 154(b) by 429 days.

(21) Appl. No.: 13/217,882

(22) Filed: Aug. 25, 2011

(65) Prior Publication Data

US 2012/0054270 A1  Mar. 1, 2012

Related U.S. Application Data

(60) Provisional application No. 61/377,329, filed on Aug. 26, 2010, provisional application No. 61/387,234, filed on Sep. 28, 2010.

(51) Int. Cl.
*G01V 1/40* (2006.01)
*G06F 15/16* (2006.01)
*G06Q 10/10* (2012.01)
*G06Q 50/02* (2012.01)

(52) U.S. Cl.
CPC ............... *G06Q 50/02* (2013.01); *G06Q 10/10* (2013.01)
USPC ................... 709/205; 709/202; 702/5; 702/6

(58) Field of Classification Search
USPC .................. 709/203, 205; 702/5, 6, 9, 11, 13
See application file for complete search history.

(56) References Cited

U.S. PATENT DOCUMENTS

| | | | | |
|---|---|---|---|---|
| 6,012,016 | A * | 1/2000 | Bilden et al. ................... | 702/12 |
| 6,829,570 | B1 * | 12/2004 | Thambynayagam et al. .. | 703/10 |
| 8,086,479 | B2 * | 12/2011 | Vachon et al. ............... | 705/7.27 |
| 8,204,692 | B2 * | 6/2012 | Arango et al. ................... | 702/9 |

* cited by examiner

*Primary Examiner* — David Lazaro  
(74) *Attorney, Agent, or Firm* — John L. Wood; Rod Anderson

(57) ABSTRACT

A networked information management system and architecture for managing files and documents pertaining to oil and gas wells and properties. On request by an authenticated user, a client workstation displays geographical information system (GIS) layers, via a web collaboration portal, for a region of the earth at which wells or properties may be located. The wells or properties within the displayed region enable links to documents or files associated with those wells and properties, and by way of which the system user can access the documents and files. Both structured and unstructured data elements can be accessed by the system. A collaboration portal allows for standardized access to the data, and also for simultaneous or collaborative access to the data. Workflow management capability is also implemented.

20 Claims, 17 Drawing Sheets

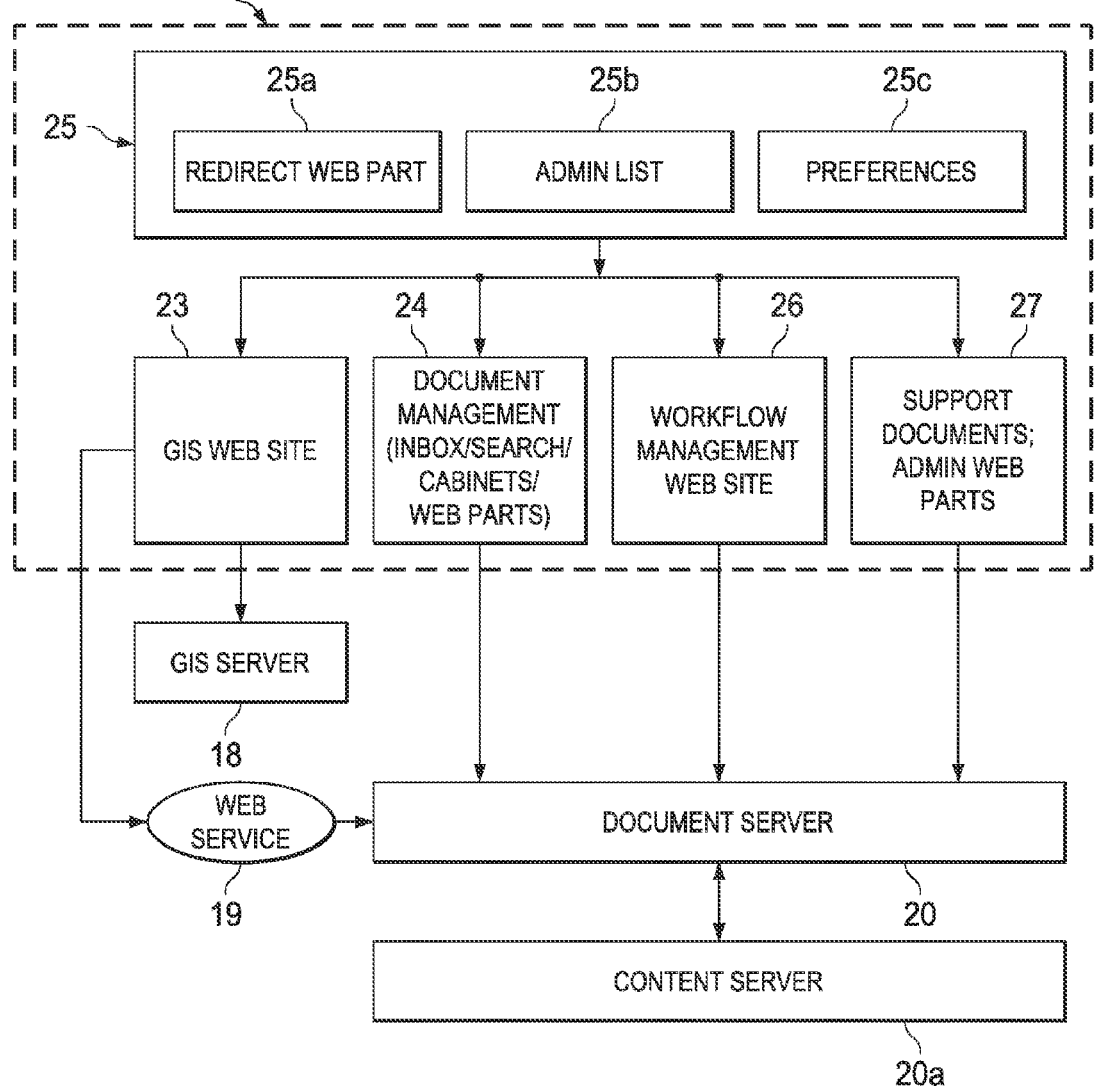

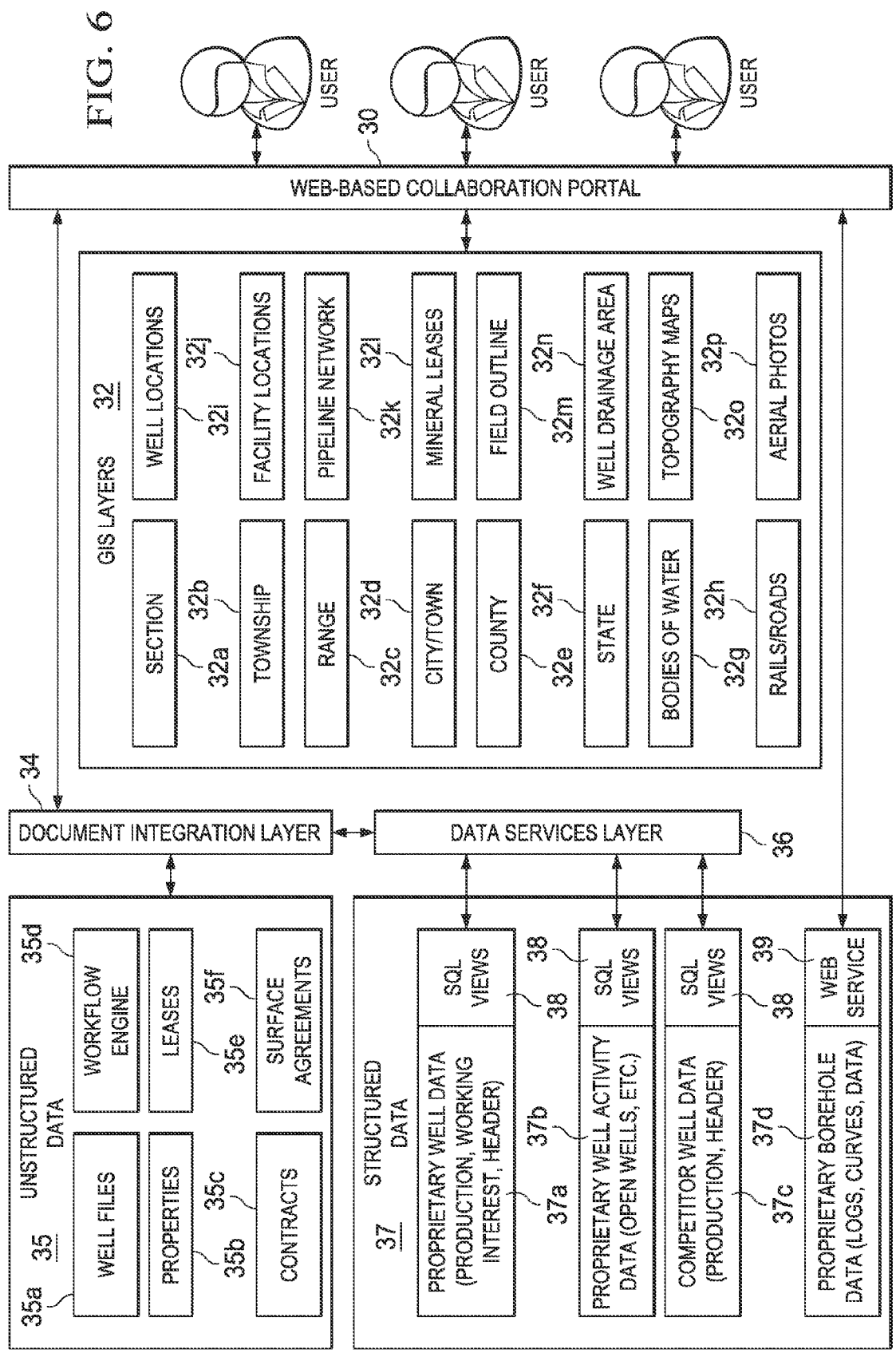

FIG. 8

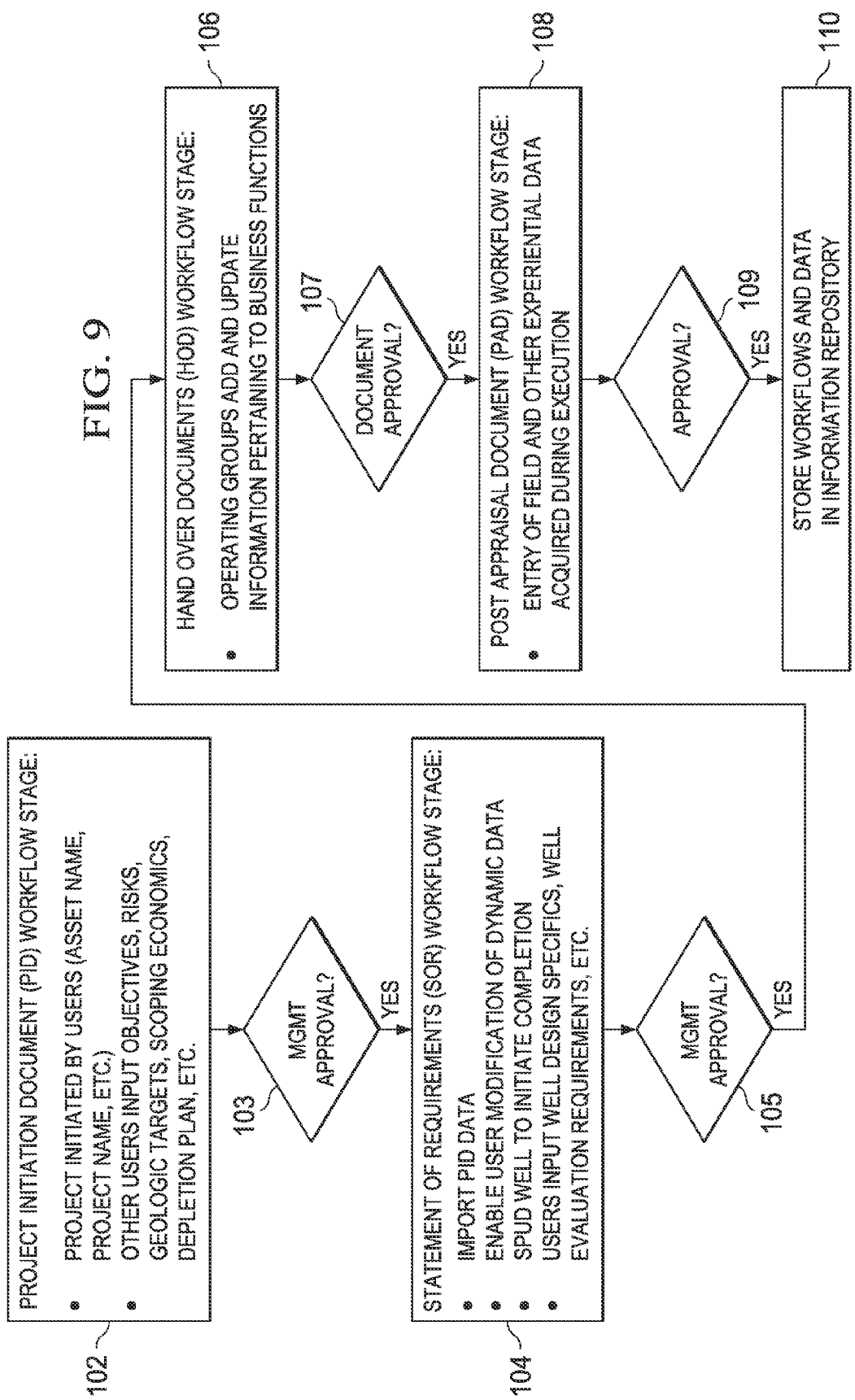

HYDROCARBON WELL INFORMATION PORTAL

CROSS-REFERENCE TO RELATED APPLICATIONS

This application claims benefit of U.S. provisional patent application Ser. Nos. 61/377,329 filed Aug. 26, 2010, and 61/387,234 filed Sep. 28, 2010, and entitled "Hydrocarbon Well Information Portal," which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

This invention is in the field of natural gas and oil (hydrocarbon) production. Embodiments of this invention are more specifically directed to the management of information regarding properties at which natural gas and oil wells are being drilled or are producing.

The economics of the oil and gas industry continue to raise the stakes for optimized hydrocarbon production. As well known in the art, the costs of drilling new wells and of operating existing wells continue to rise due to many factors. For example, new wells must be drilled to extreme depths, often in relatively inaccessible locations, in to reach remaining producible quantities of oil and gas. The cost of operating wells and production facilities also continues to rise. In addition, the integrity of producing wells must be monitored and maintained as necessary, adding additional cost to the overall production business. These high costs, as well as the relatively high prices for oil and gas in the world market, have placed significant pressure on the oil and gas producer to optimize oil and gas production in both the near and long term, while closely watching costs in doing so.

The optimization of production from a field or reservoir often involves decisions regarding the number and placement of wells, including whether to add or shut-in wells, and if so, where to do so. Once a decision has been made to drill a well, the logistics of drilling the well involves a wide range of personnel and factors. Geologists and geophysicists are involved in determining the location, depth, and direction of the well; engineering personnel are involved in arranging the specifics of the well itself; land personnel are involved to ensure that the proper rights and approvals are in place; and facilities personnel are involved to provide the appropriate support materials and equipment, including facilities for receiving well output, to name a few. Project management personnel are also involved to schedule the deployment of the necessary drilling personnel, and to specify and negotiate the necessary contracts with drilling contractors and other contract personnel and organizations. The personnel involved in these decisions are often dispersed, including personnel in different office locations, field personnel, mobile personnel, and personnel in different organizations and companies.

After a well is in place, decisions continue to be made regarding its operation. In addition, secondary and tertiary recovery operations, for example involving the injection of water or gas into the reservoir, require decisions regarding whether to initiate or cease such operations, and also how many wells are to serve as injection wells and their locations in the field. Some wells may require well treatment, such as fracturing of the wellbore if drilling and production activity have packed the wellbore surface to the extent that production has slowed. In some cases, production may be improved by shutting-in one or more wells for an extended period of time, in which case the optimization of production may require reconfiguring the entire production field.

All of these actions are performed with an eye toward maximizing production at minimum cost. As evident from these examples and as known in the art, the optimization of a production field is a complex problem, involving many variables and presenting many choices. In addition, the number and complexity of the decisions involved in drilling and operating new wells has increased with the depth and complexity of these new wells, increasing the number and nature of decision points involved in the operation of the overall reservoir.

Recent advances in technology have increased the amount of information that can be acquired from various locations and facets of an oil and gas field, and as such have enabled advanced computational and analysis techniques to extract useful information about the field from that information. Downhole and surface transducers provide real-time and periodic measurements of well conditions and operational status. Well logs, core samples, and other measurements of the formations and strata intersected by each well are also obtained, lending insight into the reservoir at and beyond the wellbore. Of course, production rates from each well and from the production field as a whole are measured over time. Beyond measurement data, documents such as field reports, maintenance records, engineering analyses, and the like that are pertinent to one or more wells in the production field are also prepared over time, and provide important insight into well history and past decisions. Some information is proprietary to the operator (e.g., status and parties to leases, location and attributes of pipelines, locations of other wells, locations of private roads, etc.), while other information important to the production operation is publicly available (e.g., topography of the production field, locations of rivers, roads, utilities, etc.). Not only is a large amount of pertinent information available, but this information exists in many forms.

Another trend involves the economies of scale that are enjoyed by larger operators in managing a large number of wells and properties over wide areas of the earth. Because of the size, number, and complexity of properties being managed, these larger operators often have many professionals involved in the management of the production effort, with these personnel often located at various facilities around the world. Various personnel also have diverse areas of skill and expertise applicable to the management of oil and gas production. As such, it would be useful for these diversely-skilled personnel, at multiple locations, to collaborate in making short term and long term decisions regarding the management of the oil and gas properties.

However, even with modern conventional information management systems, this collaboration and the resulting decisions are hampered by the time required to gather, exchange, correlate, and verify information among these people of different disciplines and at various locations. As a result of these trends and circumstances, the management of information relating to potential and producing oil and gas fields and properties, which has always been a large task, has become even larger. Unfortunately, conventional information management systems are limited in many ways. For example, documents and files pertaining to individual wells are often maintained in any one of a number of places within the overall information management system of a producer, especially in the case in which the wells being managed are located in many parts of the country or world. This dispersion of well files and documents renders it difficult for a decision maker to obtain the correct information quickly and efficiently. As a result, time-critical decisions are sometimes based on incomplete or out-of-date information and data, even if up-to-date information in fact exists somewhere in the overall information management system.

In addition, the content structure of these various files and documents varies widely. Measurement data and other objective measures pertinent to the operation are typically stored in a highly structured data set. Other information is semi-structured, while other information such as written reports and communications are essentially unstructured. Besides this variation in the structure of production field information, organizations often store these files and documents in an ad hoc manner, dependent largely on the personnel involved in generating and retaining such information. As a result, a good amount of the overall information pertinent to the oil and gas production operation is rendered essentially inaccessible or inscrutable to those personnel who are unfamiliar with the structure and organization of certain files and documents, such as those maintained in connection with a remote production field or under the supervision of a different organizational sub-unit. This variation in structure and organization is exacerbated upon an operator acquiring an existing production field or facility, as the acquired information pertinent to that acquired field or facility is necessarily of a different structure and organization.

FIG. 1 illustrates a visualization of the complexity of communications and information access for managing oil and gas exploration and production properties according to conventional techniques. Plane 2 refers to the interpersonal plane, at which personnel of the operator interact and communicate with one another. These personnel have a wide range of functions, as shown generically in FIG. 1, including land survey, operations, commercial, finance, land (i.e., leases and access right-of-ways, etc.), facilities, subsurface, regulatory, and management. These various personnel, who are likely deployed at various locations within the company and perhaps in other companies such as contractors, interact and communicate with one another in rendering decisions regarding exploration and production at the various fields. Plane 4 refers to the information plane, at which information useful to the personnel on plane 2 resides. This information is physically located at multiple locations, and in various manifestations, including multiple computer-readable data bases 3, physical files and storage locations 5, and as individual un-indexed documents 6. Each of these informational items may have importance to a particular production field, well, pipeline, land parcel, and the like, for which personnel on plane 2 are making decisions.

Operationally, this conventional information arrangement is cumbersome, insofar as rendering accurate and timely decisions are concerned. As visualized in FIG. 1, the interpersonal communication and interaction at plane 2 is ad hoc, with each interaction requiring some sort of meeting or other communication initiated by one party and participated in by others. And the access of information from information plane 4 is also ad hoc, generally requiring knowledge of the location and format of a particular item of information, or of an ad hoc index or other catalog of information. Typically, the manner in which information is stored in this rudimentary generic information management arrangement is dependent on the person storing the information, and as such can vary widely from sub-organization to sub-organization, or from person to person.

These difficulties in information management and decision making as reflected in FIG. 1 are compounded by the rate at which significant new well information is acquired by modern measurement and communication technology. Due to the ad hoc or otherwise compartmentalized organization of many conventional information management systems, such new information is not readily made available to or accessible by the appropriate personnel, particularly when such personnel are dispersed among sub-organizations and locations.

BRIEF SUMMARY OF THE INVENTION

Embodiments of this invention provide an information management system and method that provides easy access to and management of documents and data related to the exploration and production of oil and gas from various properties, in a geophysical context.

Embodiments of this invention provide such a system and method that maintain documents and files regarding the individual wells and production fields being managed in a current "evergreen" state, including within workflows for the wells and fields.

Embodiments of this invention provide such a system and method that improve decision making across operational disciplines by facilitating collaboration among professional personnel in connection with the operation of the properties.

Embodiments of this invention provide such a system and method that reduce the cycle time of field operations, and that reduce the time to ramp-up production from new resources deployed in the properties.

Embodiments of this invention provide such a system and method that integrates structured, semi-structured, and unstructured data and information containers in a manner that is accessible via a common user interface.

Other objects and advantages provided by embodiments of this invention will be apparent to those of ordinary skill in the art having reference to the following specification together with its drawings.

Embodiments of this invention may be implemented into an information management system and method of operating the same in which documents and files pertaining to individual oil and gas wells are accessible by way of a portal enabled to display the various wells and properties via a geographical information system (GIS). More specifically, a client workstation displays, in a map or other geographically-oriented format, the location of various wells and production fields. Each item (well, property, etc.) displayed in this format has links or contextual menus that allow selection of one or more documents or well files pertaining to that well or property, and specifically a most-current version of those documents and files. Workflows for each well or property can also be accessed via this GIS-enabled portal, in a manner that facilitates collaboration. Related information to the property, including financial and engineering data and documents, can also be accessed directly from the geographical display. In addition, other geographical features and facilities pertaining to that property can be displayed, and interrogated under user control. For example, one or more display layers are selectable, by way of which the user can view the attributes of the assets.

According to another aspect of the invention, an information management system and method of operating the same is provided that aggregates and integrates various and disparate items of information, including structured data files, semi-structured files, and unstructured information, and conveys that information in a meaningful way to a client by way of a geographical display and arrangement. The aggregated information includes proprietary information and publicly available information. The geographical display is provided with multiple displayable layers, by way of which various types of information pertinent to the assets can be displayed and accessed. In each case, the document or file itself is made available by way of the geographical user interface.

According to aspects of this invention, individual wells and properties proximate to one another can be efficiently viewed and analyzed by each user. Access to most recent information and status regarding each well and property is provided, regardless of the organizational position or physical location of the user; indeed, multiple users can simultaneously or sequentially access these files for each well in a collaborative effort. As a result, management of production fields and properties is facilitated, and can be more readily and efficiently optimized from an economic standpoint.

BRIEF DESCRIPTION OF THE SEVERAL VIEWS OF THE DRAWING

FIG. 5 is a schematic diagram, in block form, illustrating the logical organization of software components in an information management system and architecture according to embodiments of the invention.

FIG. 6 is a schematic diagram of software application layers in the software architecture of an information management system and architecture according to embodiments of the invention.

FIG. 8 is a screenshot illustrating an example of the use of the web-based collaboration portal in the information management system and architecture, according to embodiments of the invention.

FIG. 9 is a flow diagram illustrating the operation of the information management system and architecture of embodiments of the invention in connection with a generalized business process workflow.

DETAILED DESCRIPTION OF THE INVENTION

The present invention will be described in connection with its embodiments, namely as implemented into a networked computer system distributed over multiple locations, for managing information from multiple producing natural gas and oil fields. However, it is contemplated that other information management systems and businesses using such systems can also benefit from this invention, particularly in the management of information regarding geographically dispersed installations and equipments. Accordingly, it is to be understood that the following description is provided by way of example only, and is not intended to limit the true scope of this invention as claimed.

Figure 2:
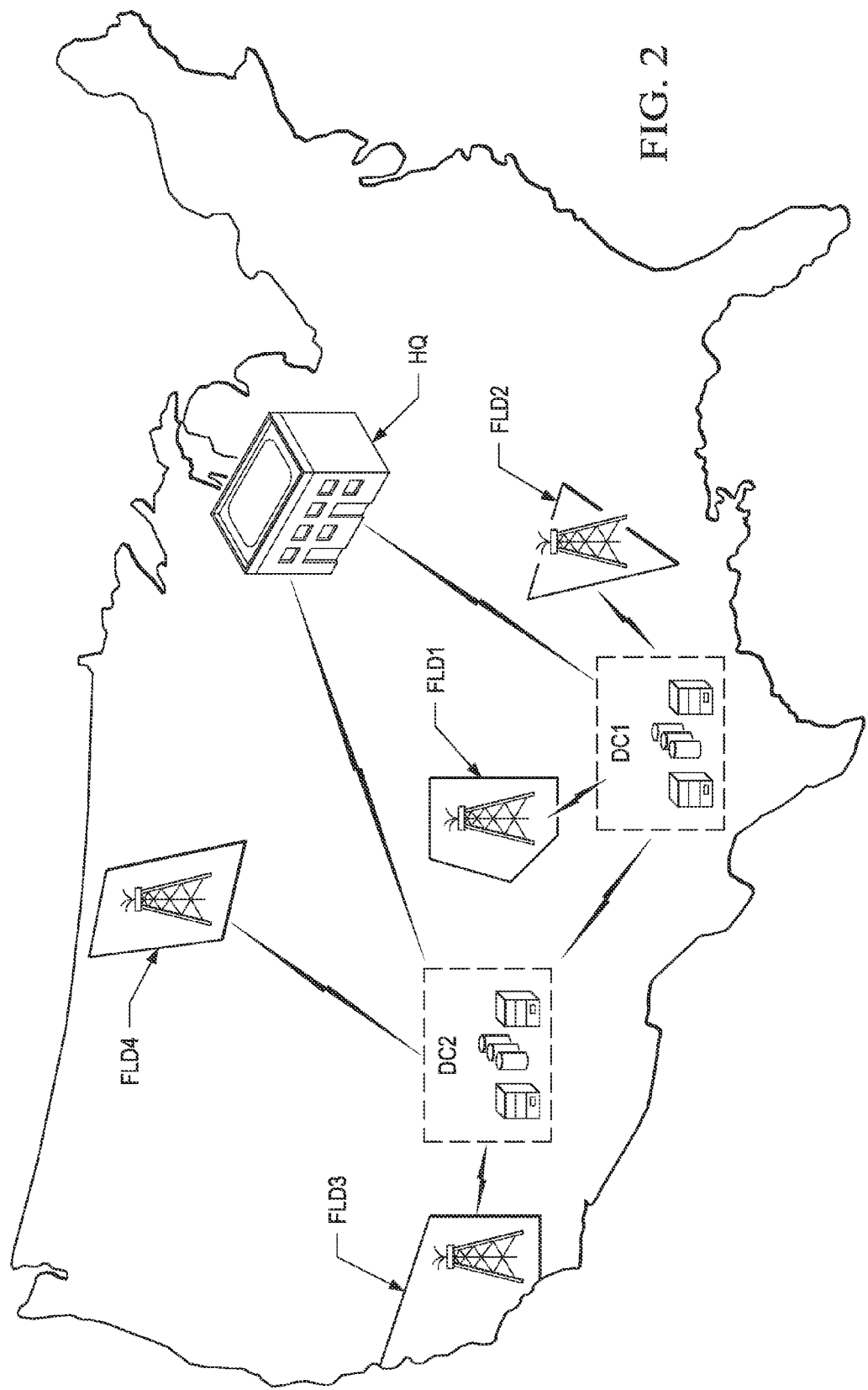
FIG. 2 is a schematic diagram illustrating the geographical spread of production fields, data centers, and company headquarters for a modern large production company.

FIG. 2 illustrates the scope of information managed by a large operator, as may be obtained from and about various producing properties. In this generic illustration, the operator is concerned with various production fields FLD1 through FLD4 that are scattered about a wide area, in this case across the country. Each of those production fields FLD1 through FLD4 include many types of information, such as information concerning oil and gas wells that are being drilled, oil and gas wells that have been drilled and are now producing or used in secondary or tertiary recovery operations, and the producing or target reservoir intersected by those wells. As known in the industry, wells pass through various stages of their life, and as such the measurement data and output of wells is often gathered and retained over the history of each well. Production data are gathered, indicating the volume and rates of production from the field FLD1 through FLD4, and from individual wells in the field, over time. These and other types of information are, of course, important to the operator.

In this generic arrangement, multiple data centers DC1, DC2 are deployed and managed by the operator. In this example, data center DC1 is in communication with production fields FLD1, FLD2 in its general geographic vicinity, and data center DC2 is in communication with production fields FLD3, FLD4. Data centers DC1, DC2 can include storage resources for storing data, measurements, and information concerning its associated production fields FLD1 through FLD4; personnel of the operator can also be deployed at or near these data centers DC1, DC2 to manage and analyze those data, measurements, and information. Headquarters facility HQ is located in a different part of the country, in this example, and serves as the location of management and other technical personnel who manage and analyze the data, measurements, and information acquired in the various production fields FLD1 through FLD4, as well as analysis results prepared by personnel at data centers DC1, DC2, in the field, or elsewhere in the overall system. The communication links between production fields FLD1 through FLD4 and their respective data centers DC1, DC2, as well as between data centers DC1, DC2 themselves and with headquarters location HQ, are conventional wired or wireless (e.g., satellite) communication links.

As such, in a typical operator's information management system, data and information concerning properties and facilities at various geographic location can be dispersed among the various data centers DC1, DC2, at headquarters facility HQ, and also at the production fields FLD1 through FLD4 themselves. Each of the personnel deployed at these various locations may have an interest in data stored at a different location, for example in determining action to be taken at their particular location or equipment, in making larger scale decisions regarding the overall management of the operator's business. As such, it is useful for these personnel to have access to information from production fields and data centers, company-wide, to the extent that may be authorized. In addition, to efficiently and accurately carry out these responsibilities, it is often optimal for personnel at different locations, and with diverse sets of skill and experience, to collaborate in the management and decision-making process. The distribution of available information among the various operating sites, the dispersion of personnel among these operating sites, and also idiosyncrasies in the manner in which information is arranged and stored among these various sites and facilities, results in a daunting information management task.

It has been observed, in connection with this invention, that the geographical relationship of wells and other field-equipment and facilities is a useful way to visualize and manage disparate sources of information to assist in the decision-making and management processes. Wells in the same region, or tapping into the same reservoir (or into connected strata of the same reservoir, or into different but connected reservoirs) have common characteristics that are useful in management of the field, but of course may also be interrelated via the reservoir itself. In other words, action taken at one well affects the production from another well. In addition, maintenance and operational personnel are often deployed to the wells themselves, such that a plan or schedule of using these personnel at other wells in the vicinity can result in efficient utilization of personnel. According to embodiments of this invention, this geographical relationship among nearby wells and production fields is used in the management of information concerning those wells and properties.

Figure 3:
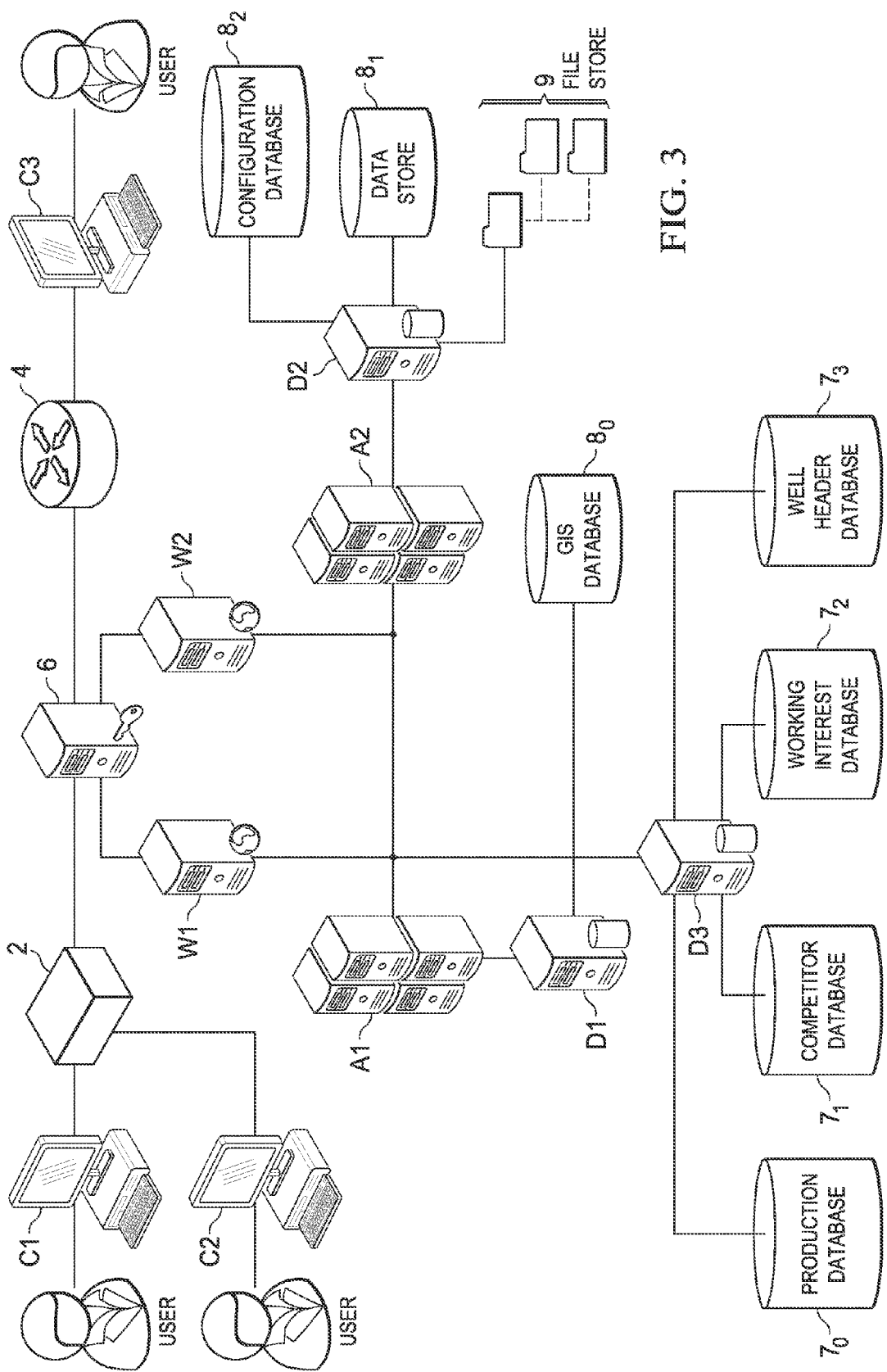
FIG. 3 is a network diagram, in generic form, illustrating an information management system and architecture according to embodiments of the invention.

FIG. 3 illustrates, in a somewhat generic fashion and from a hardware-based viewpoint, an information management system architecture according to embodiments of the invention. As evident from FIG. 3, this information management system operates according to a client/server architecture. Client systems C1 through C3 are conventional workstations or terminals by way of which system users can access, analyze, and create information stored and maintained by the overall system. It is contemplated that these client systems C1 through C3 can interface by way of various technologies and facilities. In this example, client systems C1 and C2 interface with wide-area-network (WAN) 2, such as the Internet, an "intranet" or other virtual private network, or the like. The physical interface may of course be constituted by conventional wired or wireless WAN facilities, or a combination thereof. In this example, client system C3 interfaces with the system by way of a local area network (LAN) via router 4; as is well known, several network elements including multiple switches, routers, and the like may in fact manage the communications with client system C3.

In the architecture shown in FIG. 3, the overall information system is represented by multiple "servers", including authentication server 6. The term "server" has a broad meaning within the field of information management and technology. Fundamentally, a "server" is a computer executing a computer program to provide a service in response to a request from a client. As such, the same physical computer hardware may be executing multiple server applications, each providing a different service to different clients; in other cases, a single computer may be operating as both a client (executing a client application) and also as a server (executing a server application) responding to that client. Server software may be resident and operating on multiple physical computers to provide a single server function to a client. In a purely hardware sense, the term "server" typically refers to a computer hardware that is designed and constructed primarily to execute server applications and perform server functions, for example together with other hardware "servers" in a "server farm".

To summarize, those skilled in the art will comprehend that the server architecture described in this specification in connection with FIG. 3 is not necessarily representative of a one-to-one correspondence between each server function and a single computer. Rather, it may be useful to consider the servers of FIG. 3 as "logical" servers, realized by server applications being executed on individual physical server computers or as distributed server applications operating on one or more physical server computers. It is contemplated that the architecture illustrated by the physical representation in FIG. 3 will be helpful to the skilled reader in understanding the construction and operation of the system according to embodiments of this invention, and that those skilled in the art having reference to this description will be able to readily implement these and other logical servers that are useful in realizing information management according to embodiments of this invention.

In any case, the physical server computer executing each server application, as shown in FIG. 3, includes program memory in the form of computer-readable media storing the server applications. These server applications are in the form of computer program instructions that, when executed by one or more processors within the physical server computer, cause those processors and other peripheral functions in the physical server computer to perform the functions performed by the server including those described in this specification.

Referring to FIG. 3, WAN 2 and router 4 connect to authentication server 6, by way of which access to the overall system is granted (or denied) to client systems C1 through C3. Authentication server 6 ensures that a particular user and client system Cx (referring to one of client systems C1 through C3 in this arrangement) is authorized to access the information system, for example by way of a certificate-based login, username/password combination, and the like. In addition, authentication server 6 can operate to control the particular resources to which a particular user or client system Cx is to be permitted access, and the level of privilege to be afforded to that user (e.g., read-only, read-modify, delete, etc.) relative to those resources. For authorized users and client systems C1 through C3, authentication server 6 provides access to one or more web servers W1, W2.

Web servers W1, W2 represent one or more computers operating web server applications, by way of which the client applications executing at client systems C1 through C3 can access the various information sources and applications provided by this information management system. As known in the art, an application such as a web browser executing at one of client systems C1 through C3 accesses one of web servers W1, W2, more specifically a web server application executing at that web server W1, W2 that receives user inputs and requests via the web browser client, and that communicates responses as appropriate to that web server application. According to one embodiment of this invention, web servers W1, W2 store and execute MICROSOFT OFFICE SHAREPOINT SERVER (MOSS) applications, which constitute web server applications that provide web-accessible services in a manner that enables and facilitates collaboration among multiple users. As known in the art, the MOSS framework provides a web-based user interface to client systems C1 through C3, by way of which users at those client systems C1 through C3 can access web applications executed at web servers W1, W1 as well as at other servers in the information system. The collaboration portal provided by the MOSS user interface facilitates that user access and collaboration, and also provides a uniform user interface to all users accessing the information management system.

Web servers W1, W2 respond to requests from client systems C1 through C3, within the web applications executed on web servers W1, W2. In some cases, web servers W1, W2 access procedures, programs, routines, or scripts available at one of application servers A1, A2. As known in the art, application servers A1 and A2 refer to software resources, and the computer hardware executing those software resources, that allow other computer resources (e.g., web servers W1, W2, and client systems C1 through C3) to access and execute software components provided by application servers A1 and A2. As mentioned above, the particular computer hardware operating as application servers A1 and A2 may or may not be the same hardware serving as one or more of web servers W1 and W2; in addition, the numbers of web servers W1, W2 and application servers A1, A2 may vary from one to several.

One function of application servers A1, A2 is to operate as an extended virtual machine for the web applications executing at web servers W1, W2, by transparently managing connections between client systems C1 through C3 and various databases in the overall network implementing the information management system and architecture according to embodiments of this invention. In the example of FIG. 3, database servers D1 and D2 are in communication with application servers A1, A2, respectively. As known in the art, database servers D1, D2 refer to software resources, and the computer hardware executing those software resources, that provide database services to a requesting computer or process. Such database services include responding to structured queries provided by the accessing resource, which in this case may correspond to one of web servers W1, W2 executing a procedure provided by one of application serves A1, A2 in its operation as an extended virtual machine. In the architecture of FIG. 3, database server D3 is also directly accessible to web servers W1, W2 (i.e., without executing a procedure provided by application servers A1, A2), to carry out database services in connection with its memory resources. Examples of database servers D1 through D3 known in the art include SQL, Oracle, DB2, Informix, and Ingres database servers.

According to embodiments of this invention, database server D1 provides its database services in connection with geographic information service (GIS) database $8_0$. As known in the art, and as will be described in further detail below, GIS database $8_0$ is a structured database including various types of geographical information that are selectably retrievable for individual plots of land or geography. Database server D2 provides its database services in connection with database store $8_1$, in which data provided to and generated by various software applications are stored; database server D2 also allows access to configuration database $8_2$, in which various configuration information relative to the information management system and architecture of this embodiment of the invention is retained. Database server D2 also provides its database services in connection with file store 9, at which various files and documents relevant to the management of relevant oil and gas properties may be stored. Database server D3 provides its database services in connection with other databases, including production database $7_0$ containing production data for the relevant oil and gas properties, competitor database $7_1$ containing data obtained relative to competitor wells and facilities at those relevant oil and gas properties, working interest database $7_2$ containing data corresponding to determination of the working interests in the relevant oil and gas properties, and well header database $7_3$ containing data related to specific wells, primarily in connection with the geographical location of the specific wells.

Figure 4:
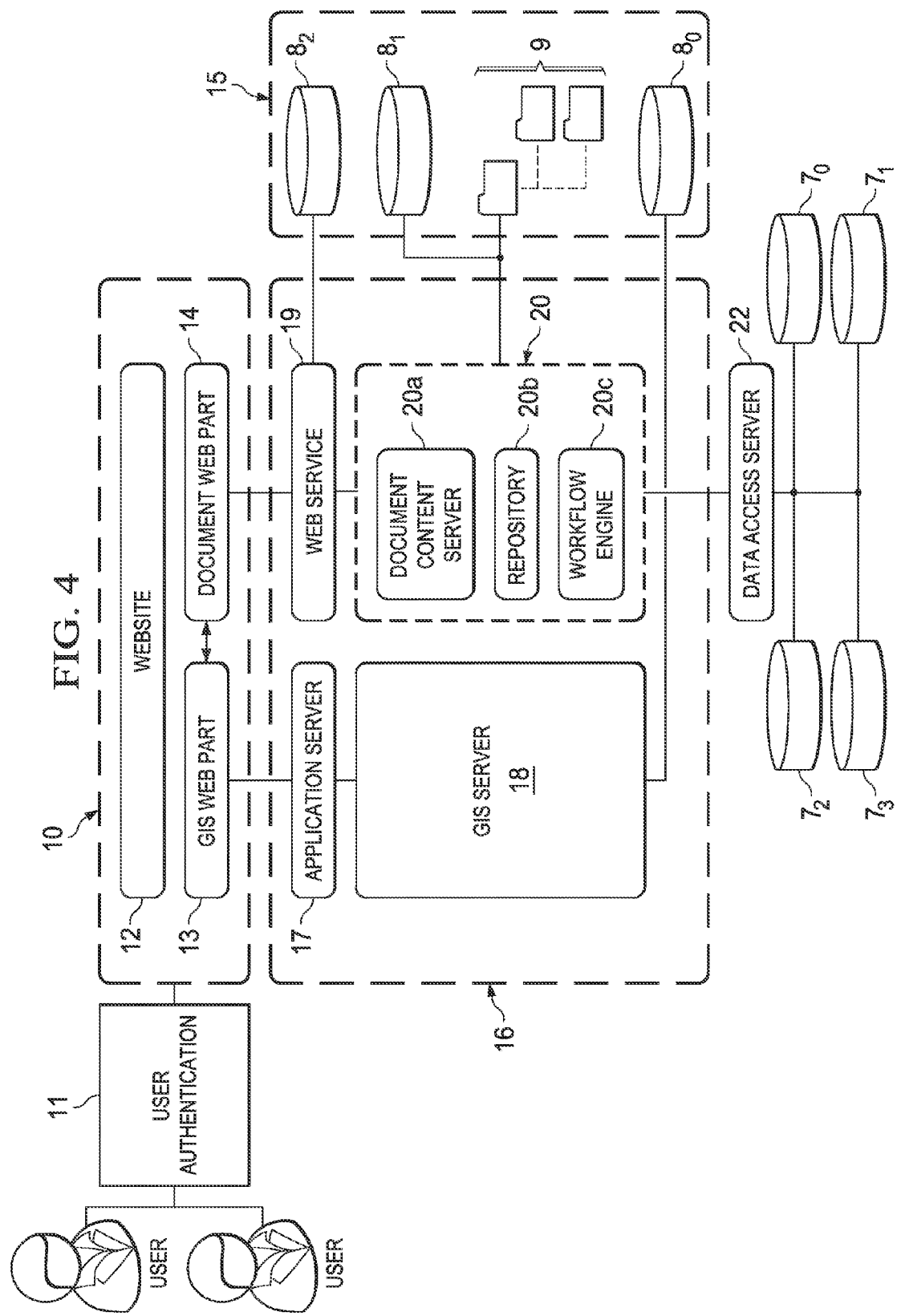
FIG. 4 is a schematic diagram illustrating the software architecture in an information management system and architecture according to embodiments of the invention.

The illustration of FIG. 3 shows, as mentioned above, a hardware-oriented arrangement of the various servers, services, and functions of an information management system according to embodiments of the invention. FIG. 4 illustrates this information management system and architecture in the form of a software-based architecture, without referring to particular computer resources (including hardware resources) providing those resources and services, as a unified information management experience. Those skilled in the art having reference to this description will readily comprehend this organization of the information management system, as will now be described.

As shown in FIG. 3, users access the information management system via user authentication module 11, by way of which access to some or all of the information managed by the system is controlled. For example, a username and password combination may be required of the user; other security techniques such as certificates, biometric validation, and the like may alternatively be interrogated and evaluated by user authentication module 11. Other security features may also be implemented by way of user authentication module 11, such features including user groups of users having similar permission levels. Further in the alternative, different data resources in the system may require different username/password combinations or different log-in credentials.

Assuming successful validation of the credentials of the user by user authentication module 11, presentation layer module 10 is made accessible to the user. Presentation layer module 10 serves as the base portal framework and user interface to the information management system of embodiments of this invention. It is contemplated that this interface will appear to the user, at his or her client system Cx, in the form of a familiar website interface. For example, as indicated in FIG. 4, presentation layer module 10 makes various functionality available to the user. Web site function 12 corresponds to the function executed by presentation layer module 10 that presents a web page interface to the user, including such functionality as links, common menu functions, and the like. Various "web parts" are also arranged and presented by presentation layer interface 10. GIS web part 13 (or "web widget") refers to a portable object of computer-readable code that is installed and executed from within web site 12. Essentially, GIS web part 13 is a stand-alone executable application, executed by the computer resource carrying out the function of presentation layer module 10 (e.g., web servers W1, W2 of FIG. 3), within the context of the displayed web site. In this context, GIS web part 13 provides access to, display of, and navigation within, geographical information that is accessed from a GIS database (as described below). Document web part 14 is another web part, in the form of an executable application, by way of which various data and documents stored within the information management system and architecture according to this embodiment of the invention, are accessed.

As will be described in further detail below, GIS web part 13 cooperates with document web part 14. More specifically, GIS web part 13 is realized by program code that includes custom code (e.g., custom .NET code) that integrates the GIS navigation and display functions with document web part 14, so that the user can access documents by way of and within the context of the display of GIS information accessed via GIS web part 13.

Presentation layer module 10 can be realized using conventional collaboration interface software known in the art. In embodiments of this invention, as described above, MICROSOFT OFFICE SHAREPOINT SERVER (MOSS) applications are web server applications useful for providing the web-accessible services of presentation layer module 10, as described herein. As known in the art, this MOSS framework is useful in providing a common interface by way of which multiple users can readily collaborate. As such, it is contemplated that the collaboration portal of the MOSS user interface provides a uniform user interface to all users accessing the information management system, and is thus a useful choice for implementation of presentation layer module 10 of FIG. 4.

By way of web parts 13, 14 in presentation layer module 10, or otherwise via web site function 12, authenticated users can access and invoke execution of various applications 16. In this architecture, GIS web part 13 accesses application server 17, by way of which component procedures such as processes, routines, and the like are acquired for execution under user control via presentation layer module 10, in connection with the accessing of GIS information. These functions provided (and, perhaps, executed) by application server 17 include access to GIS server 18. GIS server 18 in FIG. 4 refers to the software functionality by way of which geographical information in GIS database $8_0$ is accessed in response to user input via presentation layer module 10. A commercially available example of GIS server 18, and useful in connection with the information management system and architecture of embodiments of this invention, is the ArcGIS SERVER software package available from ESRI, preferably including the ArcSDE spatial data management server. In any case, GIS server 18 provides web-oriented spatial and geographical database services in accessing GIS database $8_0$, for display to the user via presentation layer module 10. In the example in which GIS server 18 is realized by the ArcGIS SERVER software package and the ArcSDE server, GIS database $8_0$ may be realized as a relational database of the geographical information.

Applications 16, to which presentation layer module 10 provides access according to embodiments of this invention, also include document web service 19, which provides access to various documents relating to the oil and gas properties being managed. Web service 19 refers to an application programming interface (API) that is accessible via document web part 14 in presentational layer module 10, by way of which the user obtains access to document server applications 20. According to embodiments of this invention, the document services in this architecture are implemented by way of the DOCUMENTUM enterprise content management platform, available from EMC Corporation, in cooperation with the DOCWAY content management software products available from Wingspan Technology, Inc. In that context, document web part 14 is implemented as a DOCWAY web part, which cooperates with web service 19 (e.g., an installation of a DOCWAY web service) to access and execute document server applications 20 of FIG. 4, which are implemented (in this example) by an instance of a DOCWAY web server. In this example, document server applications 20 include document content server 20*a*, document repository 20*b*, and workflow engine 20*c*. Document server 20 executes the requested queries, search terms, browsing commands, and the like received via document web part 14, to access associated application data sources 15, which in this example include data store $8_1$ and file store 9. Web service 19 is also capable of directly providing database services with configuration database $8_2$, containing user and configuration information, including configuration information relating to integration with GIS data.

Document server applications 20 also access external data information server 22. External data information server 22 is a database server (e.g., database server D3 of FIG. 3), for example a COMPOSITE information server available from Composite Software Inc., by way of which document server applications 20 can access data sources 7 containing information originally acquired and stored outside of the DOCUMENTUM system. As described above, these data sources 7 include production database $7_0$ containing production data for the relevant oil and gas properties, competitor database $7_1$ containing data obtained relative to competitor wells and facilities at those relevant oil and gas properties, working interest database $7_2$ containing data corresponding to determination of the working interests in the relevant oil and gas properties, and well header database $7_3$ containing data related to specific wells. These data sources 7 can also include external data sources maintained by other entities, such as IHS Inc. For example, external data sourced by IHS can include information pertaining to individual wells, such as a well name, the API number for the well, details about the location of the well, etc.; data available in the public domain that pertain to competitor wells; and the like. Applications 20, and web service 19, are capable of correlating and associating data obtained from these external (i.e., external to document server applications 20) data sources 7 with the data and documents obtained from data sources 15. As mentioned above and as will be described in further detail below, these contents stored in external data sources 7 and information obtained from data sources 15 are integrated, at presentation layer module 10, with GIS information obtained by GIS server 19, to provide an integrated geographical access tool to the user.

FIG. 5 presents a logical view of the architecture of the information management system of embodiments of this invention. Presentation layer module 10, in this view, includes portal web site 25, through which access to various web sites 23, 24, 26, 27 is provided. Portal web site 25 includes redirect web part 25*a*, which is a web widget by way of which the user accesses one of web sites 23, 24, 26, 27. For example, web sites 23, 24 etc. may be displayed within the overall website 25 by way of frames within the displayed web site 25, each selectable by the user under the control of redirect web part 25*a*. Another example of redirect web part 25*a* is a "tab" function, by way of which the user can select a GIS-based view via GIS web site 23, a document management view via document management web site 24, a workflow management view via web site 26, or a support view via web site 27. Also within web site 25, "admin" list 25*b* consists of the current configuration setting for the system, and preference list 25*c* consists of the operational preferences for the specific user.

GIS web site 23 within presentation layer module 10, as described above, includes GIS web part 13 (FIG. 4) that accesses GIS server 18 (via GIS application server 17 as described above), to obtain the desired GIS information for display via web site 25. As will be described in further detail below, GIS web site 23 allows selection of various "layers" of the GIS information to be queried by GIS server 18 and displayed within web site 25. In addition, as shown in the logical presentation of FIG. 5, GIS web site 23 also accesses web service 19 (for example, via GIS web parts 13 and document web part 14) to access documents associated with a particular geographical area, as may be obtained by GIS server 20. For example, GIS web part 13 within GIS web site 23 may make a request to web service 19 by passing a unique well identifier (or API) as may be identified by the user from displayed GIS information. Web service 19 may be hosted on the presentation layer module 10 server (e.g., MOSS server), if desired. Web service 19, after validating that the user has sufficient permission for the access, connects to document server 20, which executes the communicated query and returns the result of that query, as obtained via content server 20a as shown in FIG. 5, to GIS web site 23 for communication and display to the user via web site 25, for example by way of a frame or tab corresponding to GIS web site 23. An example of a suitable server application for document server 20 is the DOCWAY suite of content management products available from Wingspan Technology, Inc. Documents pertaining to the displayed geographical area may be presented by document management web site 24, for example by way of a pop-up window in the form of a "cabinet" of the contents of a folder for that well, including or alternatively by way of a hyperlink to that folder or file. Users may, similarly, upload documents pertaining to a particular well at a specific GIS location by way of this connection.

Document management web site 24 allows the user, via web site 25, to access or view documents separately from the GIS display. In this example, document management web site 24 includes several web parts, or web widgets, including an inbox web part, a search web part, and cabinet (browsing) web parts. The web parts included within document management web site 24 interact with document server 20, which hosts the web services required by the document web parts of document management web site 24; those web services of document server 20 access content server 20a, and thus the data and files stored in the corresponding sources 15 (FIG. 4).

Workflow management web site 26 provides a workflow-based environment for managing business and operational processes, particularly those that are document-centric, in connection with the various wells and properties being managed. As known in the art, the term "workflow" refers to a defined sequence of connected operations or steps ("activities") involved in accomplishing a particular objective, such as drilling or operating an oil or gas well. In general, operations or steps within a workflow may have dependencies, because some steps cannot begin until other steps are completed. In the context of the information management system and architecture according to embodiments of this invention, and as will be described below, various users within functional groups create, edit, or approve documents that contribute to the operations of the well; according to embodiments of this invention, these documents are maintained in a centralized well database, such as databases $7_0$, $7_2$, $7_3$, $8_2$ (FIG. 3). Typically, one user initiates a workflow for a particular well or property; based on the defined process and associated documents for each step of the process, and other users will receive a message indicating they have a "task" that requires their attention in order for the workflow to proceed to the next step. Workflow management web site 26 provides an environment by way of which current workflow tasks (i.e., tasks awaiting completion), documents prepared or in process in connection with a workflow, or workflows created or "owned" by a particular system user, can be retrieved by a system user based on his or her identity. These documents and files are accessed by way of queries generated and executed by document server 20, via content server 20a.

Support web site 27 provides access to support and "help" documents for the information management system, and also admin web parts by way of which the configuration and operation of the system can be configured and modified.

Another view of the information management system and architecture according to embodiments of this invention, as applied to oil and gas wells and properties, is illustrated in FIG. 6 in a form indicative of the various data elements and functional data flow paths.

As shown in FIG. 6, the users access the system by way of web-based collaboration portal 30, as invoked and displayed at their respective client systems C1 through C3 (FIG. 3). As mentioned above, typically the program code for web-based collaboration portal 30 is stored, fetched, and executed at a different physical computer from client systems C1 through C3, with client systems C1 through C3 merely viewing that execution by way of a web browser application and interface. For example, in the arrangement of FIG. 3, web servers W1, W2 may correspond to the computing resource executing the program code (i.e., presentation layer module 10) for web-based collaboration portal 30. In any case, web-based collaboration portal 30 corresponds to the interface provided by presentation layer module 10 described above in connection with FIGS. 3 through 5, for example by way of web site 25 (FIG. 5). Each of the users accessing web-based collaboration portal 30 thus view a common interface, by way of which these users can view the same information at the same time (e.g., during an online "meeting"), or at different times in a collaborative effort, regardless of their physical location or organizational assignments and boundaries. Web-based collaboration portal 30 provides tools (e.g., web parts) that allow the users to access (search, browse, etc.) various sources of information, in an integrated manner. According to embodiments of this invention, the integration of the available data and information is performed on a geographical basis, using GIS information and layers, such that the data and information, whether structured (i.e., database contents) or unstructured (documents in text or image form), can be identified and viewed according to the geographical position of the wells and properties to which the data and information pertain. To accomplish this integration, web-based collaboration portal 30 includes specific computer-executable program code to associate these data and information, in the manner described above in connection with FIG. 5.

As such, web-based collaboration portal 30 provides access to information in the form of GIS layers 32. As known in the art, and as described above, GIS layers 32 organize this geographical information by way of geographic attributes that can be individually selected for display by the user, via web-based collaboration portal 30. Typically, the display of GIS information by way of layers depends on the nature of the layer information itself: geographical boundaries are shown as boundaries, specific locations shown by point or area icons or shading, and wider scale information (maps, photos) indicated by selectable links with pop-up windows or frames. Web-based collaboration portal 30 also enables the ability to search the GIS database by way of GIS layers 32, for example by way of political boundaries layer information (section layer 32a, township layer 32b, range layer 32c, city/town layer 32c, county layer 32e, state layer 32O. The display of retrieved GIS information can show these various identifiers by way of displayed boundaries and identification overlays, for the selected ones of these political boundary layers 32a through 32f. GIS layers 32 also include physical and facility layers, such as body of water layer 32g and railroad/surface road layer 32h, each of which can be displayed to the users via web-based collaboration portal 30.

Oil and gas production facilities and locations can also be displayed geographically, according to embodiments of this invention, by way of specific layers in the GIS database. In this example, as shown in FIG. 6, GIS layers 32 include well location layer 32i, facility location layer 32j, proprietary (i.e., belonging to the operator) pipeline network layer 32k, mineral (oil and gas) lease layer 32l, production field outline layer 32m, and well drainage area layer 32n. Pop-up or overlay geographic layers are also available, for example topography map layer 32o, and aerial photo layer 32p. Aerial photo layer 32p can replace the graphical representation of the displayed geography, with boundaries and specific locations overlaid onto the aerial photo of the selected region, as known in the art.

Web-based collaboration portal 30 also allows users to access information, such as data and documents, associated with the geographical regions being viewed or selected, by way of document integration layer 34. Document integration layer 34 refers to database servers, software modules, and other functionality, such as described above, by way of which both unstructured data 35 and structured data 37 associated with a particular geographical region or item (well, production field, lease, road, etc.), each which may have different file formats, can be accessed and displayed to the user, in an integrated manner, by way of web-based collaboration portal 30. According to embodiments of this invention, document integration layer 34 may interrogate unstructured data 35 and structured data 37 according to unique well identifiers as may be identified by the user from displayed GIS information. In embodiments of this invention, documentation integration layer 34 integrates oil and gas well and property information with GIS layers by way of a data key, assigned to each well or property, and that is a common identifier for that well or property in each of the domains of spatial data (e.g., GIS layers 32), unstructured data 35 including unstructured meta data, and structured data 37. The various components involved in accessing the desired data and documents refer to the well or property by way of this key, which thus serves as a cross-reference identifier for the well or property. For oil and gas wells in the United States, examples of this key or identifier include the 10-digit or 14-digit API well number, assigned to the particular well as a unique, permanent, numeric identifier under an industry standard established by the American Petroleum Institute; the Global Unique Well Identification (GUWI) number assigned to the well (or converted from another identifier such as the API well number) under the standard established by Information Handling Services (IHS); and one or more proprietary well identifier defined or otherwise maintained by the operator or other party. For non-well properties such as leases or tracts, the key or identifier may be an agreement number, or one or more proprietary identifier for the particular property. Multiple keys or identifiers may be used for each well or property, depending on the particular data servers involved in integrating data between the spatial data, structured data, or unstructured data domains. As such, the particular manner in which document integration layer 34 executes the access of the desired information varies, depending on the type of data being accessed.

Unstructured data 35 includes, for these embodiments of the invention, several types of data and information stored in various formats. Types of unstructured data 35 include well files 35a, which itself includes various types of documents specific to a particular well. Examples of well files 35a include procedures, reports, analyses, logs, assessments, and the like; these documents and files may be text or images (scanned documents), and may be generated and accessed by personnel from a wide variety of functions and sub-organizations (e.g., land negotiators, regulatory personnel, facility and safety engineers, drilling and completion engineers, environmental engineers, operations and production engineers and personnel, and resource development personnel such as geologists, geophysicists, and reservoir engineers. Well files 35a also include documents and files pertaining to well properties 35b, contracts 35c (e.g., contracts between the operator and drilling contractors, completion contractors, and the like), pertinent leases 35e, and surface rights agreements 35f. In addition, workflow engine 35d is accessible to document integration layer 34, from within unstructured data 35. As will be described in further detail below, workflow engine 35d operates to analyze and report the status and upcoming tasks involved in the drilling and operation of particular wells and properties; such tasks generally result in reports, analyses, contracts, and the like that are contained elsewhere within unstructured data 35.

In the arrangement of FIG. 6, as described above, these unstructured data 35 are stored by way of document services implemented by way of the DOCUMENTUM enterprise content management platform, which are made available able to collaboration portal 30 realized by way of the MICROSOFT OFFICE SHAREPOINT SERVER (MOSS) applications by way of document integration layer 34. Alternatively to the DOCUMENTUM platform, unstructured data 35 may be stored in the form of a SHAREPOINT library available under the SHAREPOINT 2010 applications available from Microsoft Corporation, in which case those unstructured data 35 can be accessed without the need for document integration layer 34. Collaboration portal 30 itself may also alternatively be realized by way of the SHAREPOINT 2010 applications, as desired.

Referring to the architecture of FIG. 6, many types of structured data 37 are also accessible to the users via web-based collaboration portal 30 and document integration layer 34. In the data flow of FIG. 6, document integration layer 34 accesses these structured data 37 by way of data services layer 36. Data services layer 36 refers to those database servers, web services, software modules, and the like involved in generating and forwarding structured searches, for example SQL queries, based on the unique well identifier (e.g., API, GUWI, proprietary identifier, etc.) selected by the user from displayed GIS information for that well including that identifier, and communicated via document integration layer 34.

Access from data services layer 36 into structured data 37 is made, according to this example, by way of one or more SQL views 38 associated with various structured databases 37a through 37c. As known in the art, SQL views 38 correspond to virtual tables of stored queries for the corresponding database. Typically, as known in the art, SQL views 38 are dynamic virtual tables that are generated from the contents of the associated databases. In this example, SQL views 38 can access proprietary (i.e., owned by the operator itself) well database 37a, proprietary well activity database 37b, and competitor well database 37c. Proprietary well database 37a includes, for example, production data by time, working interest data, well headers, and the like for wells owned by the operator associated with the users. Proprietary well activity database 37b includes data indicative of the status of particular wells and properties, such as lists and properties of open wells, and the like. Competitor or third party well database 37c includes, for example, production data and well header information for wells operated by external parties to the operator, and in the same general or specific vicinity as the operator's own proprietary wells and properties. Other structured databases may, of course, be additionally or alternatively included within structured data 37 accessible to users of the information management system and architecture according to embodiments of this invention.

Other structured databases may also be directly accessible from web-based collaboration portal 30. For example, as shown in FIG. 6, web-based collaboration portal 30 interfaces with web service 39 to query and access a structured database corresponding proprietary borehole database 37d; in this example, database 37d includes well logs, borehole curves of temperature, pressure, etc., and other structured data pertinent to specific boreholes and the immediately surrounding formations. These data obtained from proprietary borehole database 37d via a web service 39 are integrated by web-based collaboration portal 30 along with other data and documents, for display and use by the corresponding users.

In addition to accessing these various unstructured data 35 and structured data 37, users can readily upload files, documents, and data entries into unstructured data 35 and structured data 37 via web-based collaboration portal 30, document integration layer 34, and data services layer 36, as the case may be according to the type of data, documents, and other information being uploaded.

While specific architectures and data flows are included in this description of embodiments by way of example, it is contemplated that other architectures and approaches, including the user and incorporation of newer software technology, may alternatively be used to realize the invention. For example, it is contemplated that the K2 software applications available from Sourcecode Technology Holdings, Inc. may serve as the standard workflow tool for orchestrating and managing the flow of information and data. Further changes and alternatives to the overall integration framework can be realized by way of layers including:

Standard User Interface: Use of a common tool: SHAREPOINT 2010 applications with additional applications created by way of the SILVERLIGHT development platform, also available from Microsoft Corporation, to provide enhanced user experience;

Standard workflow: Managed by the K2 software applications, to standardize the management of data-centric workflows;

Standard data services layer: Providing the conduit to transfer data across various internal user applications accessed within the collaboration system.

In an arrangement such as this architecture, the data pertaining to the workflow are entered in ASP.Net forms with Telerik controls; these data are then available as structured data. Other alternatives and arrangements are of course also contemplated in connection with embodiments of this invention, as may be selected and implemented by those skilled in the art having reference to this specification.

As mentioned above and as will become more apparent from the following description, the information management system and architecture according to embodiments of the invention enable a large set of users to access data and information pertaining to wells and information, from a geographically presented interface that presents information related to the location of particular wells and properties, as well as surrounding features and elements to those wells and properties. In addition, this common geographical search, query, and access of these data and information can be made by way of a common interface, facilitating collaboration among the users of the system.

Figure 7A:
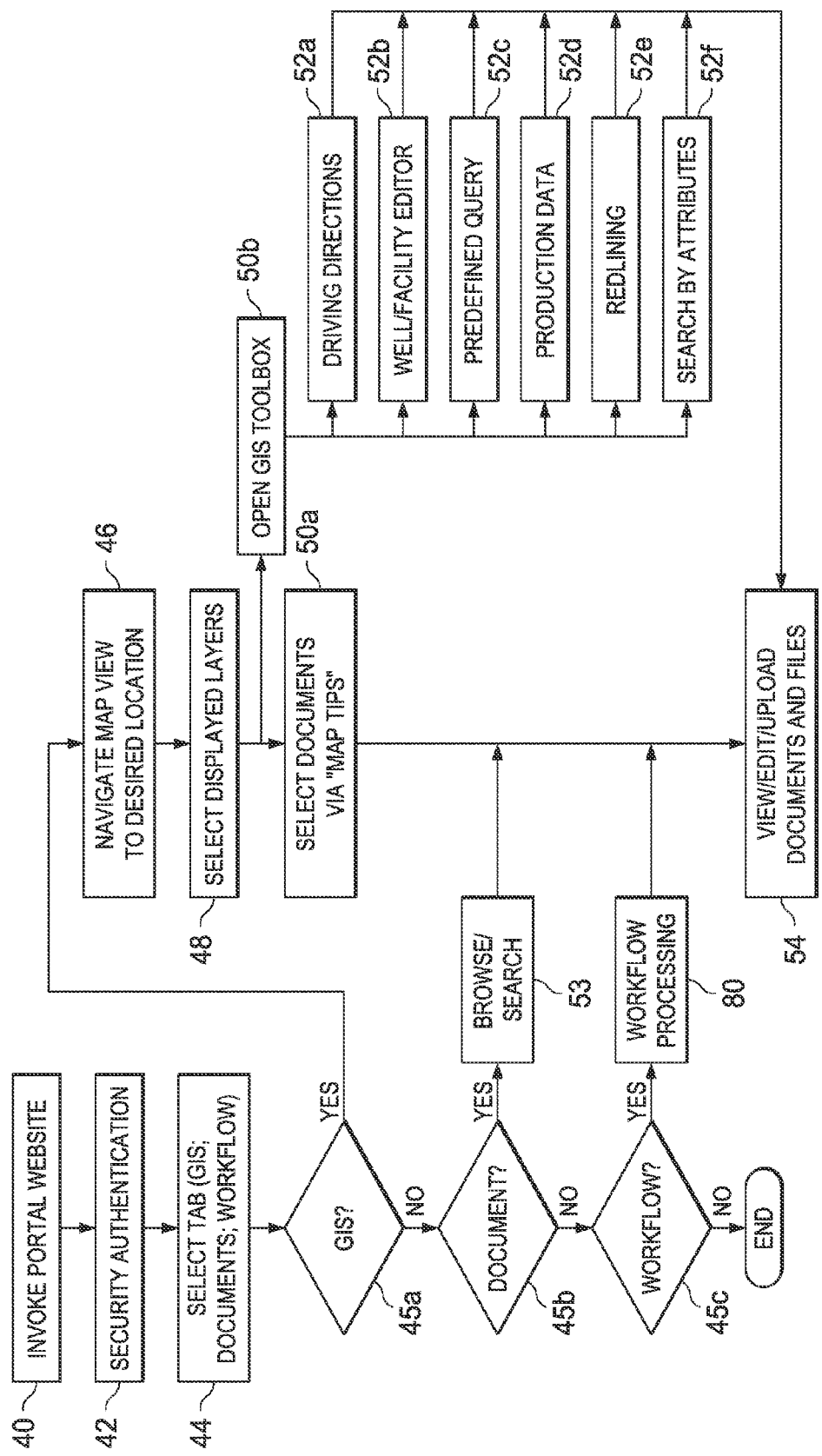
FIG. 7a is a flow diagram illustrating the operation of the web-based collaboration portal in the information management system and architecture, according to embodiments of the invention.

Referring now to FIGS. 7a through 7f, an example of the operation of the information management system and architecture according to embodiments of this invention will be described. FIG. 7a illustrates a generalized flow diagram as used in connection with the display of integrated documents with geographical (GIS) information, such as in a map view. As evident from the foregoing description in connection with FIGS. 3 through 6, the information management system and architecture of embodiments of this invention is especially well-suited toward navigation and access of the information with reference to the geographic location and environment of wells and properties. It is contemplated that such an information management system described above, can be readily programmed according to the architecture described above, by those skilled in the art having reference to this specification, without undue experimentation. Of course, in so doing, it is contemplated that those skilled artisans would modify and adapt the system and architecture described above; it is also contemplated that such variations and adaptations are within the scope of the invention as claimed.

The operation of an instance of the information management system and architecture of FIGS. 3 through 5, begins in process 40 by a user invoking web-based collaboration portal 30, for example by way of its web-site 25. In process 42, the invoking user is authenticated, for example by way of a username/password combination, certificate or other key, or the like. As mentioned above, the permissions and credentials of the user may be limited to certain types of data and information, or to certain wells and properties. Website 25 of web-based collaboration portal 30 is then presented to the user, at the user's client workstation (e.g., client systems C1 through C3). As described above, the user can then navigate through this website 25, via its various frames, web parts, and the like, to search for and access data and information regarding particular wells and properties.

In process 44, according to this embodiment of the invention, the user selects the manner in which he or she wishes to access or view information. As described above relative to FIG. 5, various web sites 23, 24, 26, 27 are made available to the user, within web-based collaboration portal 30, via redirect web part 25a within web site 25. For example, different "tabs" may be made available, from which the user may select one of web sites 23, 24, 26, 27 as the desired navigation approach. Decisions 45a, 45b, 45c determine which of the sub-web sites 23, 24, 26, 27 are selected by the user.

Figure 7B:
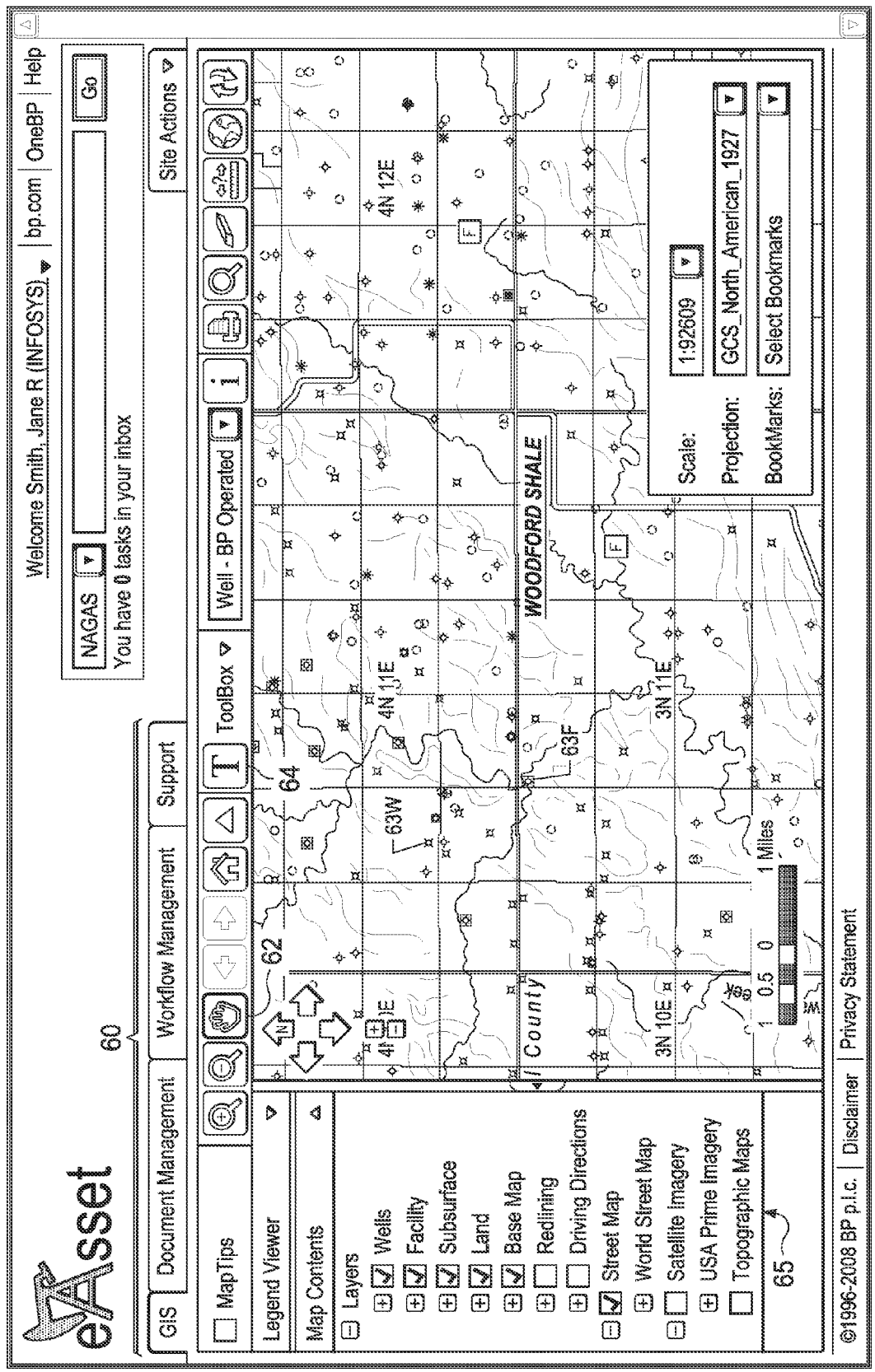
FIGS. 7b through 7f are screenshots illustrating examples of the use of the web-based collaboration portal in the information management system and architecture, according to embodiments of the invention.

FIG. 7b shows a "screenshot" of web site 25, in which redirect web part 25a is implemented by way of four tabs 60: tabs 60 allow selection of GIS web site 23, document management web site 24, workflow management web site 26, and support web site 27. In the example of FIG. 7b, GIS web site 23 is selected in process 44, by way of its associated one of tabs 60. As a result of this selection (decision 45a is "yes"), as shown in FIG. 7b, a map view of a portion of the earth is displayed within the main window of web site 25. In the conventional manner for Internet map web sites (e.g., GOOGLE Maps, available online at maps.google.com, from Google Inc.), the user can navigate from within this map view, in process 46 of FIG. 7a. For example, the user can zoom the resolution (and thus the displayed area) in or out, move the viewed location by way of a hand tool (selected, in this case, by button 62), or move the viewed location in a selected north/south/east/west direction, in the conventional manner for such map web sites. Other navigation tools and techniques may also be applied to the map view presented and navigated in process 46, as known in the art.

Referring back to FIG. 7a, web-based collaboration portal 30 can select one or more GIS layers 32 (FIG. 6) for display within GIS web site 25, in process 48. The available layers correspond to those layers 32a through 32p shown in FIG. 6, and variations thereof. The screenshot of FIG. 7b illustrates the manner in which GIS layers 32 can be selected. In the example shown in FIG. 7b, the selected GIS layers include "wells", "facility", "subsurface", "land", "base map", and "street map", as indicated by the checked boxes within GIS layer frame 65. Each of these layers can be further expanded, to select and not select certain features or sub-layers within each layer. In the main frame of this screenshot, a portion of a particular property is shown in a map view, illustrating those layers. Township and range identifiers are shown (e.g., "4N11E", etc.), as is a sub-window indicating the scale and projection of the current map view. Wells are indicated by small icons, for example as shown by well 63W; production facilities are similarly indicated, for example as shown by facility 63F.

Figure 7C:
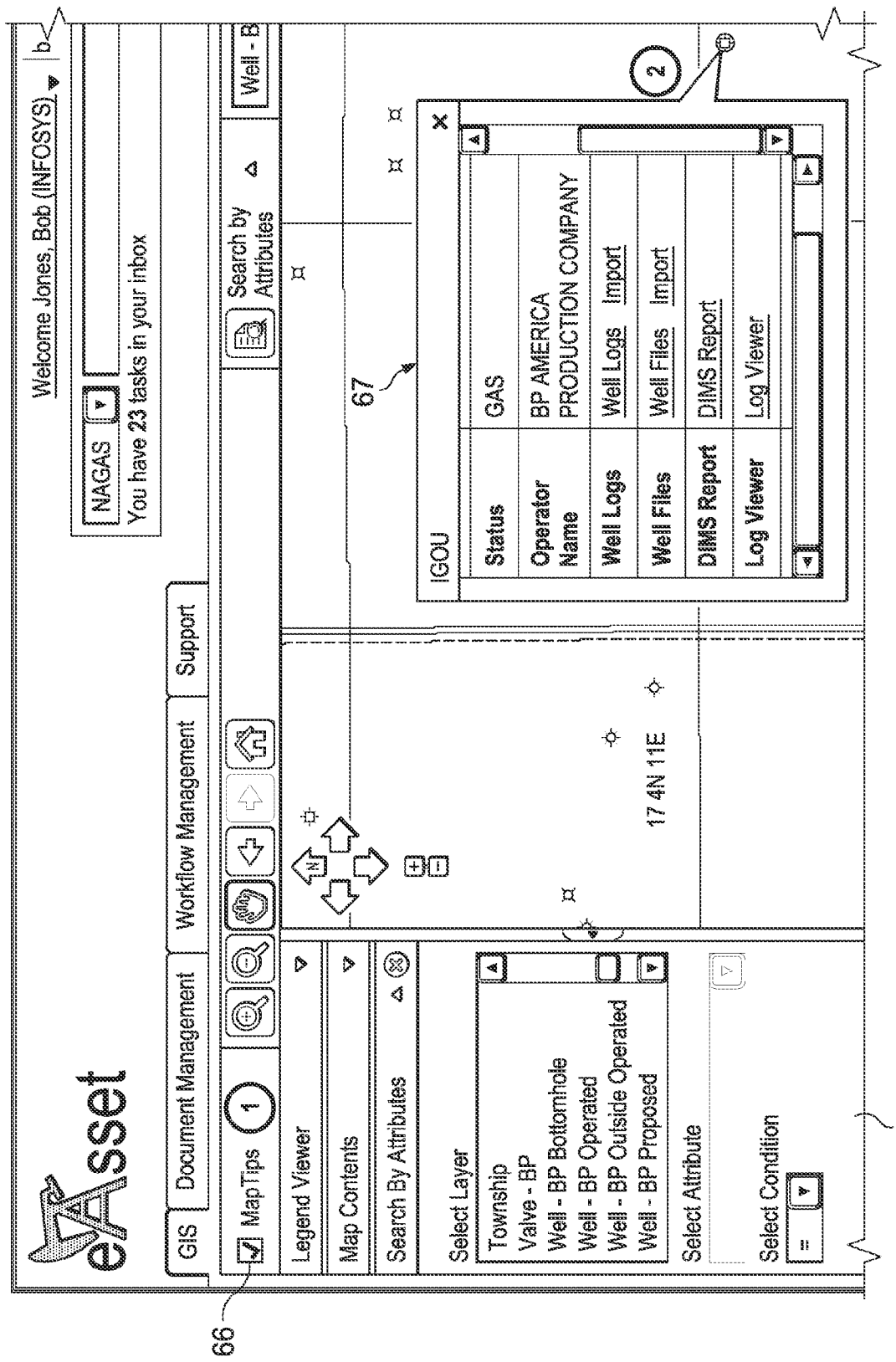

Referring back to FIG. 7*a*, one option available to the user for finding documents and data pertinent to wells such as well 63W is the use of "map tips", in process 50*a*. FIG. 7*c* illustrates an example of the use of map tips by execution of process 50*a*. The map tips functionality is enabled by selection of "MapTips" box 66 in the GIS toolbar, as shown in FIG. 7*c*. The user may specify particular classes of wells, facilities, or other features and installations to be shown in the map view by way of search by attribute sub-window 68, by way of which the user may select one or more specific layers, or select an attribute, condition, or other defining attribute of the features and installations that the user desires to view in the map view; other wells, facilities, etc. not meeting the "search by attributes" criteria will not appear. Once selected, the user then rolls or hovers the cursor of his or her client system Cx over an indicator for a particular well, facility, or other feature or installation displayed in the map view, a pop-up window for that feature or installation appears at the display of client system Cx. In the example of FIG. 7*c*, pop-up window 67 shows some of the available documents and data for a well. This pop-up window 67 includes an indication of the name and status of the feature and installation, as well as live links to documents and data associated with that feature or installation. In the example shown in FIG. 7*c*, a well "IGOU" is the feature selected by the user, and is indicated as a gas well operated by "BP America Production Company". Links are provided in this pop-up window 67 to well logs for this well, well files for this well, a "DIMS report" for this well (i.e., which pertains to borehole and drilling reports for that well as it was drilled), and a "log viewer" link to a script or application for viewing well logs over time for that well, for example by showing multiple logs side-by-side with one another.

It will be evident to those skilled in the art having reference to this specification that the information management system and architecture described above in connection with FIGS. 3 through 6 will respond to the user inputs received via web-based collaboration portal 30 by executing its various program modules and functions. Referring to FIG. 6, by way of example, web-based collaboration portal 30 obtains the desired information from GIS layers 32 as selected by the user, and in response to map tips process 50*a*, in this case, obtains identifiers for available unstructured data 35 via document integration layer 34, and identifiers for available structured data 37 via document integration layer 34 and data services layer 36. Document integration layer 34 combines the links and identifiers for the appropriate unstructured data 35 and structured data 37, and presents those links and identifiers to web-based collaboration portal 30 for presentation to the user via pop-up window 67 in the example of FIG. 7*c*. As described above, according to embodiments of this invention, document integration layer 34 obtains these links and identifies for unstructured data 35 and structured data 37 for a particular well or property identified via GIS layers 32, by way of a data key that is assigned to each well or property, and that serves as a common identifier for that well or property in each of the domains of spatial data (e.g., GIS layers 32), unstructured data 35 including unstructured meta data, and structured data 37. Examples of such a key or identifier include well numbers (e.g., API or GUWI well numbers, or proprietary well numbers or identifiers) and agreement numbers. Of course, the particular manner in which these links and identifiers are displayed to the user need not be a pop-up window, but could be some other approach (frame, new window, etc.), perhaps as selected by the user according to his or her user preferences.

Once the criteria and corresponding well, facility, or other feature or installation is selected by the user by way of map tips process 50*a*, and the pop-up window 67 with links to the specific documents, files and data appears, process 54 can then be executed by way of which the user can view, edit, upload, and otherwise operate on specific documents, files and data of interest via his or her client system Cx. It is contemplated that authentication process 42 will determine the appropriate permissions for the user (i.e., read-only, read/write, etc.), which will of course control the access provided in process 54. The various servers in the information management system and architecture described above, and involved in obtaining the desired data or document, will then respond to the user request, and present that data element to the user via web-based collaboration portal 30. It is contemplated that process 54, in allowing the user to view and possibly edit the document or data file, will be carried out in many cases by opening a local application program within client system Cx, or alternatively a web-based application program executed at web server W1 or W2, or at another server in the system. The particular application will, of course, depend on the type of document or file selected by the user via web-based collaboration portal 30. As such, it is contemplated that the particular applications so opened for viewing and possibly editing of the documents and files can be a .pdf document reader, a spreadsheet application, a text editor or word processor, a database program, and the like, as conventional in the art. According to embodiments of this invention, a significant benefit is the ability to open, view, and edit the actual documents and files associated with a particular well or property, from within a geographic view of the location of the well or property. Web-based collaboration portal 30 enables this geographic access of well and property documents, by way of a common interface that facilitated collaboration among the various users and responsible organizations.

Upload of new documents or data can also be effected, for example by the user clicking the appropriate "import" link within pop-up window 67. Web-based collaboration portal 30 will then present the user with the appropriate dialog by way of which the user can identify the location of the document or data to be imported; the appropriate server functionality within the information management system and architecture, for example document server 20 and associated modules, will then receive and store the imported document or data. An important benefit of the information management system and architecture according to embodiments of this invention is provided in the context of imported or uploaded documents, in that web-based collaboration portal 30 provides a uniform interface for the uploading of those documents and data. By associating these uploaded data elements with a particular well via portal 30, those uploaded data elements now become accessible to other users, by way of the same GIS-based geographical display, regardless of the physical location of the uploaded file, and regardless of the business or personnel organizational role of the uploading user. This common interface thus facilitates the availability of current analyses and information pertaining to wells and facilities in production fields, to all relevant personnel involved in the management and operation of those facilities, and thus facilitates the collaboration of those personnel throughout the organization, regardless of physical location or organizational role.

Referring back to FIG. 7*a*, another approach available to users via web-based collaboration portal 30 is by execution of a GIS "toolbox" process 50*b*. The web site view of FIG. 7*b* illustrates toolbox button 64, by way of which the user can open the GIS toolbox function from his or her client system Cx. According to embodiments of this invention, GIS toolbox process 50b within web-based collaboration portal 30 provides multiple "tools" by way of which the user can perform functions, including searching for particular properties. FIG. 7a illustrates several of these tools. Driving direction tool 52a invokes a search of GIS layer 32h to provide information regarding the shortest driving path between locations (e.g., wells, locations, latitude/longitude, or company office locations), as well as turn-by-turn directions. Well/facility editor tool 52b allows the user to edit attributes about a well or facility, such as the well header information for a well, and to create entries for new wells or facilities. Predefined query tool 52c allows the user to select a previously defined and stored database query, generally a commonly used query; it is contemplated that the user may store certain "favorite" queries that can be retrieved by that user via predefined query tool 52c. Examples of predefined queries include wells inside a specified county (or other named geographical or political region), wells by a specified operator, wells by API/UWI number (either by full number, or by partial number, such as by using wild cards). It is contemplated that the results from these queries may be displayed in a window, or exportable to a word processing or spreadsheet document at client workstation Cx. Production data tool 52d invokes a display of production data for company-owned and operated wells, company-owned wells operated by others, and competitor wells in the displayed area. Redlining tool 52e allows the user to make annotations on the displayed map view, either freehand or using drawing tools. Search-by-attributes tool 52f invokes a search tool within web-based collaboration portal 30 by way of which the user can search for wells, facilities, etc. that satisfy one or more attributes. Other tools, such as a security tool for changing user permissions, and a preference editor for entering and editing user-level preferences and options in using web-based collaboration portal 30, may also be provided.

Figure 7D:
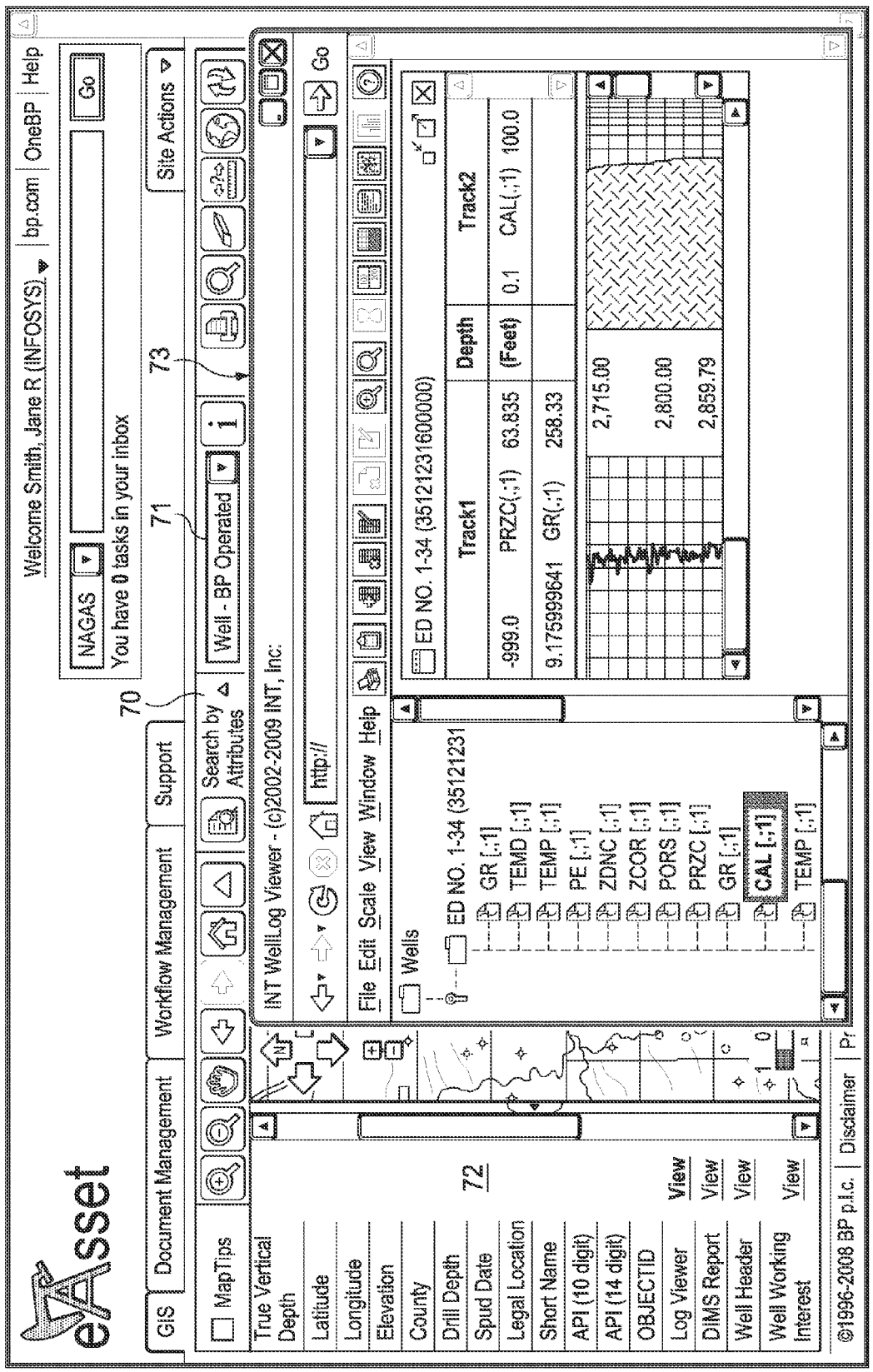

Following selection of one of the tools 52a through 52f within GIS toolbox process 50b, and user entry of the desired values within the selected tool as appropriate, the corresponding results are displayed in the map view frame for viewing, editing, and perhaps uploading in process 54, in the manner described above. For example, FIG. 7d illustrates an instance of the use of search-by-attribute tool 52f. As evident from FIG. 7d, toolbox button 64 is now replaced by pull-down menu 70, which allows selection of a particular tool 52a through 52f; search-by-attribute tool 52f has been selected in this instance, as evident within pull-down menu 70 in FIG. 7d. For this tool 52f, the particular attribute being searched by is selected in pull-down menu 71, for example "Well-BP operated" as shown in FIG. 7d. In response to that selection, the map view (partially hidden in FIG. 7d) will show those wells meeting the criteria within the current field of view. By clicking on a particular well (which may be identified in the map view as the user rolls the cursor over a well indicator), header information for the selected well is presented in frame 72; as shown in the example of FIG. 7d, this header information includes information concerning that well including a well name, well number, an API indicator, the owner, operator, its location (latitude/longitude), etc.

Also within header frame 72, as shown in FIG. 7d, links to various documents and data pertaining to the well are provided. As mentioned above in connection with map tips process 50a, a "log viewer" is provided, by way of which various logs and curves can be displayed side-by-side, enabling analysis of the interaction between measurements. Window 73 illustrates an example of the use of this log viewer for the well identified in frame 72. As shown in FIG. 7d, an "explore" navigator is provided in the left-hand pane of window 73, by way of which logs and curves can be selected for side-by-side display in the right-hand pane, as shown in this example.

Figure 7E:
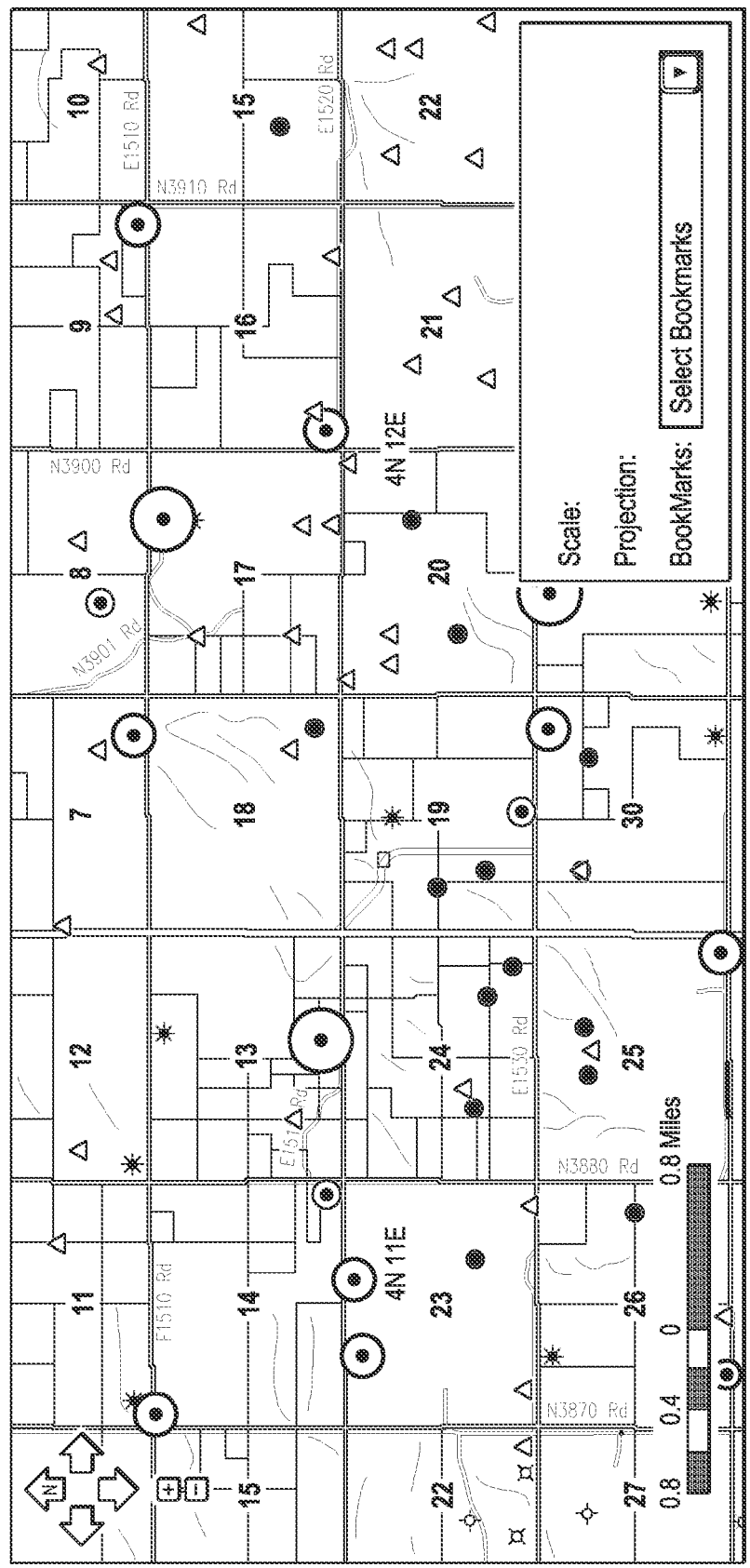
Figure 7F:
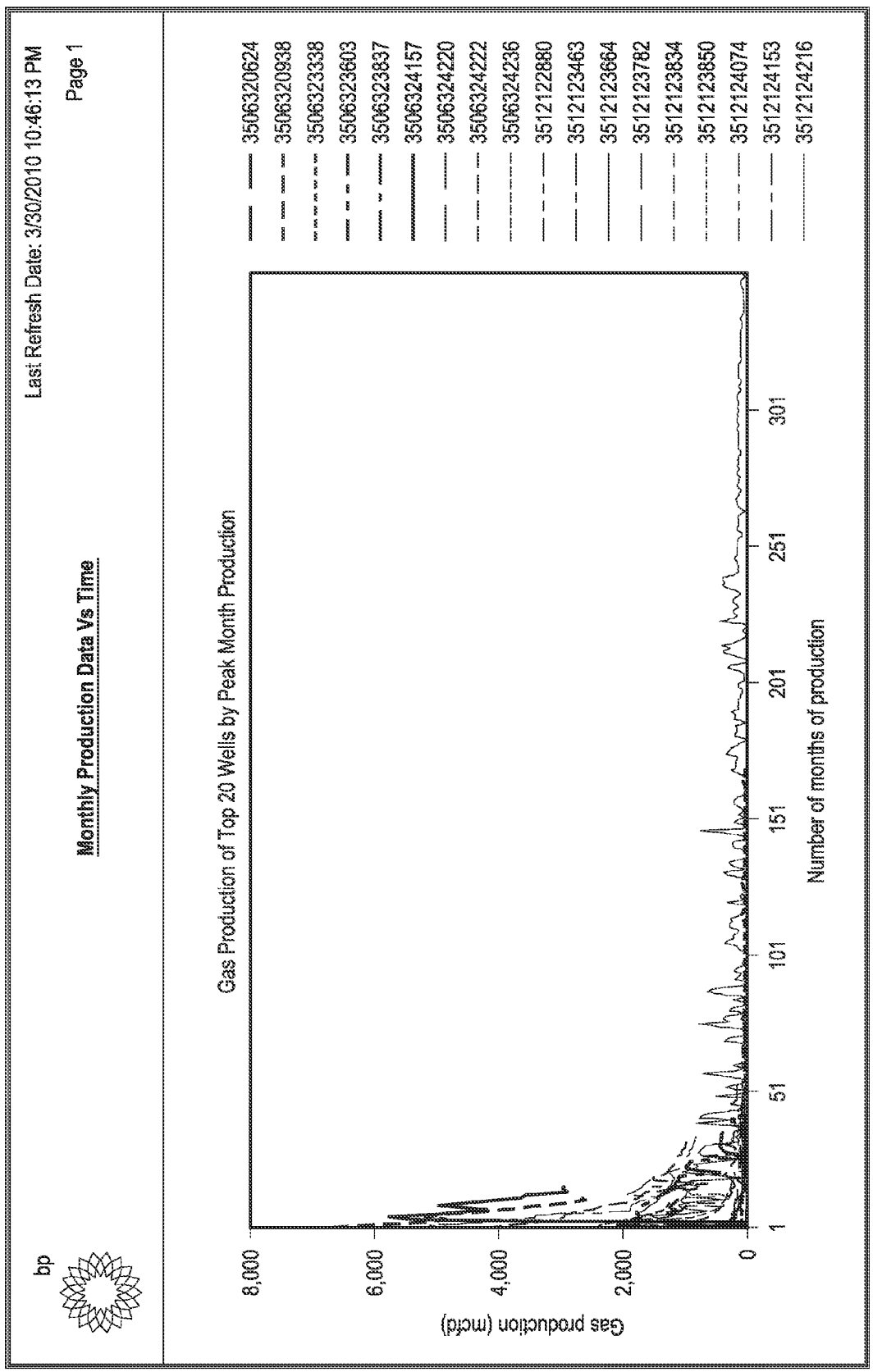

FIG. 7e illustrates an example of the results of production data tool 52d, within GIS toolkit process 50b, according to a "bubble" chart display. According to this embodiment of the invention, upon the user invoking production data tool 52d and selecting the bubble chart display type, the production from those wells within the current map view (and which, perhaps, are constrained to certain attributes or criteria) is illustrated in process 54 at client system Cx by way of bubbles, with larger bubbles corresponding to higher production levels. Typically, a time period over which the production is to be displayed is selected by the user by way of production data tool 52d. As evident from FIG. 7e, the bubble chart display of production rates, as overlaid onto a geographical map view, provides an excellent visualization of production in a production field, from which additional analysis may be made by the user. In addition to the size of the various bubbles, other visual indications may be applied by web-based collaboration portal 30, such as different colors for production levels greater than, at, or less than a forecasted rate. Other choices for the type of plot used to illustrate production from wells within the displayed area include a pie chart, and also a line graph for the displayed wells, such as shown in FIG. 7f. A purely numerical report (e.g., suitable for importing into a spreadsheet) may alternatively be selected.

Referring back to FIG. 7a, if a document management view is selected rather than a GIS or geographical view (decision 45a is "no" and decision 45b is "yes"), then GIS web site 23 (FIG. 5) is not instantiated. Rather, web-based collaboration portal 30 opens document management web site 24, by way of which the user is presented with multiple ways of finding particular documents, data, and other files, according to embodiments of this invention. Process 53, in the operation of web-based collaboration portal 30 shown in FIG. 7a, is then executed to enable browsing of the databases and file stores in the information management system and architecture according to this embodiment of the invention, structuring of a search query by way of which the various servers will identify possible pertinent documents and files, and viewing of a list of "favorite" folders and files, as saved previously by the user within web-based collaboration portal 30.

Figure 8:
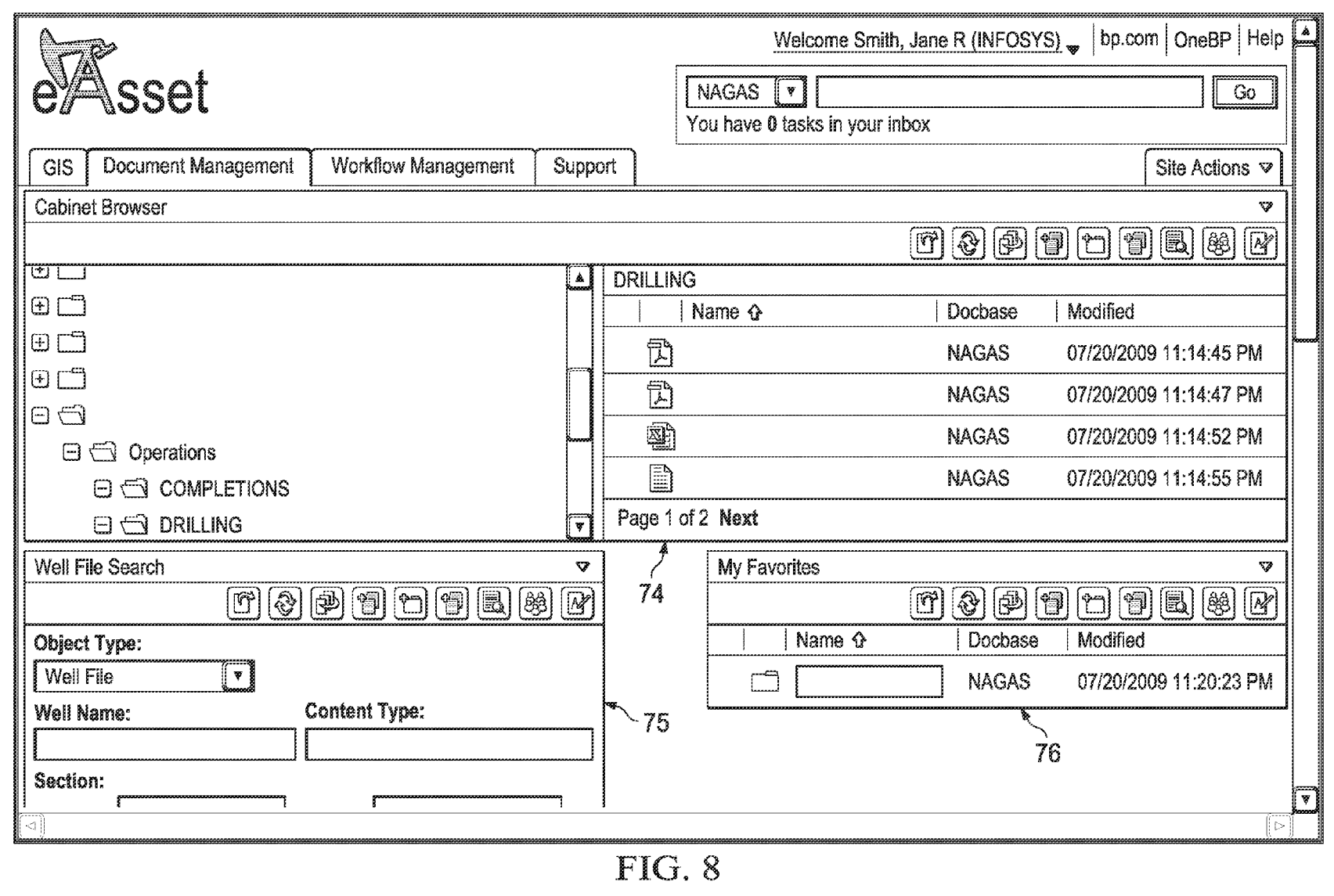

FIG. 8 illustrates an instance of an example of document management web site 24, invoked in response to the selection of the document management tab from web site 25. Various frames are provided by web-based collaboration portal 30 to the user in this event. Cabinet browser frame 74 provides a traditional browsing experience, by way of which documents and files are arranged by well, by field containing the wells, and by function within each well. In the example of FIG. 8, a well named "Ramona 1-6H" is selected, and expanded by the user to display various functions within which documents are grouped; in this example, the "drilling" folder under "Operations" is selected, with the right-hand pane within frame 74 showing a list of some of the documents within this folder. These documents can be directly opened, by way of a double-click by the user, by the corresponding application (.pdf reader, spreadsheet application, text editor, etc.). A structured search of well files can instead by generated by the user via frame 75, in which entries into various well file fields (well name, content type, etc.) can be entered by the user. Favorites frame 76 provides access by the user to his or her previously saved favorite folders, for quick access to documents and files that the user repeatedly or often refers. Other frames, such as an advanced free-form search frame, can also be included within document management web site 24.

Following the search and browse, and identification, of process 53, the selected document, data, or other files can be viewed and, if authorized, edited by the user in process 54. In addition, uploading of new documents can also be performed via document management web site 24.

Referring back to FIG. 7a, if the user instead selects the "Workflow Management" tab 60 (FIG. 7b) in process 44, rather than the document management view or the GIS view (decisions 45a and 45b are "no", and decision 45c is "yes"), then workflow management web site 26 (FIG. 5) is instantiated. Workflow management process 80 is then performed, by way of which the user can view and manage the creation and operation of various wells and properties, from the viewpoint of his or her responsibilities and action items.

The term "workflow", for purposes of this embodiment of the invention, refers to a defined sequence of connected operations or steps ("activities") involved in accomplishing a particular objective. These connected operations or steps may have dependencies, such that certain steps cannot begin until other steps are completed. In the context of an organization, different personnel or functional groups may be assigned to different steps (and may be carrying out similar steps in other workflows, according to the specialization of that group). The management of a business activity according to workflow concepts is known in the art. For example, the creation and operation of an oil and gas well, over its life, can be considered as a workflow consisting of a sequence of several workflow phases, each phase including several tasks, and with "phase trigger" events serving as necessary steps for moving from one phase to the next.

In a general sense, the execution of workflow management process 80 by the information management system according to embodiments of this invention allows users and other personnel to manage and be awarded accountability for key documents created through the course of business processes such as the creation and operation of an oil and gas well. In modern oil and gas operations, various users within functional groups create, edit, or approve documents that contribute to the operations of the well; according to embodiments of this invention, these documents are maintained in a centralized well database, such as databases $7_0$, $7_2$, $7_3$, $8_2$ (FIG. 3). Within workflow management process 80, one user initiates a workflow for a particular well or property; based on the defined process and associated documents for each step of the process, other users will receive a message indicating they have a "task" that requires their attention in order for the workflow to proceed to the next step. The various steps in the process can be performed sequentially (e.g., if one task must be completed before another task starts), in parallel, or both. A particular task may be completed by the uploading of the appropriate document to the information management system, by the user responsible for the task (its "owner"). As such, workflow management process 80 interfaces with process 54, by way of which the user can view, edit, upload, and otherwise operate on specific documents, files and data of interest via his or her client system Cx. In tandem with the document repository, this workflow approach provides a mechanism to establish accountability for completing the well file documentation according to the standards established, and to ensure that the well file stays up to date with the most recent documentation pertaining to that well (i.e., "evergreen"). It is contemplated that a wide range of workflows can be realized and supported according to embodiments of this invention, including such workflows as new well delivery, well work hopper and prioritization, well intervention, and other important business processes.

Referring now to FIG. 9, a generalized business process workflow applicable to multiple processes related to oil and gas production, as carried out by an information management system and architecture constructed and operating according to embodiments of the invention, will now be described. In this high level business process workflow, the information management system and architecture is capable of managing these multiple processes in such a manner that all the data pertaining to wells in one or more production fields, such data generated as a part of several business processes and workflows, are made available to relevant users through a single spatial (GIS) interface. It is contemplated that a portion of the data pertaining to the workflow stages are entered by users into pre-existing forms, such as ASP.Net forms with Telerik controls; these data can reside as structured data within the information management system and architecture of embodiments of this invention, and also may be converted into portable, and thus more readily accessible, formats such as the well known .pdf format.

In a general sense, the overall business process workflow includes i) a Project Initiation Document (PID) workflow stage; ii) a Statement of Requirements (SOR) workflow stage; iii) a Hand-over Documents (HOD) workflow stage; and iv) a Post Appraisal Document (PAD) workflow. Of course, additional or fewer stages may be implemented, or similar stages to those shown in FIG. 9 and described herein but with the individual tasks differently arranged. It is contemplated that those skilled in the art having reference to this specification will readily be able to implement such a generalized business workflow, within the scope of this invention.

As shown in FIG. 9, the generalized business process workflow begins with Project Initiation Document (PID) workflow stage 102, in which the users initiating a particular large-scale project provide basic definitional information such as the asset name, project name, and the like. Those information establish the PID, upon which various users (including users other than the initiators) to enter data pertaining to the defined project, such as Objectives, Risks, Geologic Targets, Scoping economics, a depletion plan for the asset, and the like. Following entry of that additional data pertaining to the project, the workflow proceeds to subsequent stages where it is reviewed and approved (decision 103) by such functions as reservoir management, and relevant supervisory personnel responsible for new well delivery.

Upon approval in decision 103 of the PID generated in workflow stage 102, Statement of Requirements (SOR) workflow stage 104 can be initiated by the relevant users. In this SOR workflow stage 104, those data entered into forms during the PID workflow stage 102 are automatically transferred to the SOR being generated in workflow stage 104, in combination with an option for those users to modify and update only the dynamic data fields in the PID. In addition, the users enter additional data such as well design specifics, well evaluation requirements etc. Following importation and input of the data relevant to the SOR, the completed SOR is reviewed and approved in decision 105 by the appropriate users, such as the operative management personnel responsible for new well delivery, drilling management, completion management, and the relevant facilities group.

Upon approval of the SOR in decision 105, the generalized business process workflow initiates Hand-over Documents (HOD) workflow stage 106. In this workflow stage 106, responsible personnel in various responsible business functions such as Construction, Drilling, Completions, and Operations review the data previously entered into the PID and SOR, and enter updated or additional data relevant to those specific business functions. Approval of documents generated in this HOD workflow stage 106 is obtained from key stakeholders (decision 107), as necessary according to the operative business practices before making the individual completed documents available, via the information management system and architecture of this invention, to the relevant function assigned to particular tasks according to pre-designed workflows.

In Post Appraisal Document (PAD) workflow stage 108, authorized users can review the data previously entered into the information management system and architecture for this project in stages 102, 104, 106, record and enter new data based on actual experience with execution of the project, such as data obtained during drilling of the relevant well. Those data entered in PAD workflow stage 108 are then also reviewed and approved by the authorized users (decision 109), after which the completed workflows and data are stored within the information management system of embodiments of this invention in process 110. These workflows and data can be stored in the form of structured data (e.g., those data entered into forms) and also unstructured data, such as documents rendered as pdf files based on the data entered in forms. In either case, as described above, these documents and data can be made accessible to users through the GIS/spatial interface in the manner described above, along with other well files. Those data originally entered into forms, and then rendered as .pdf files, are thus readily available for review and portability at any point in the workflow cycle.

Figure 10A:
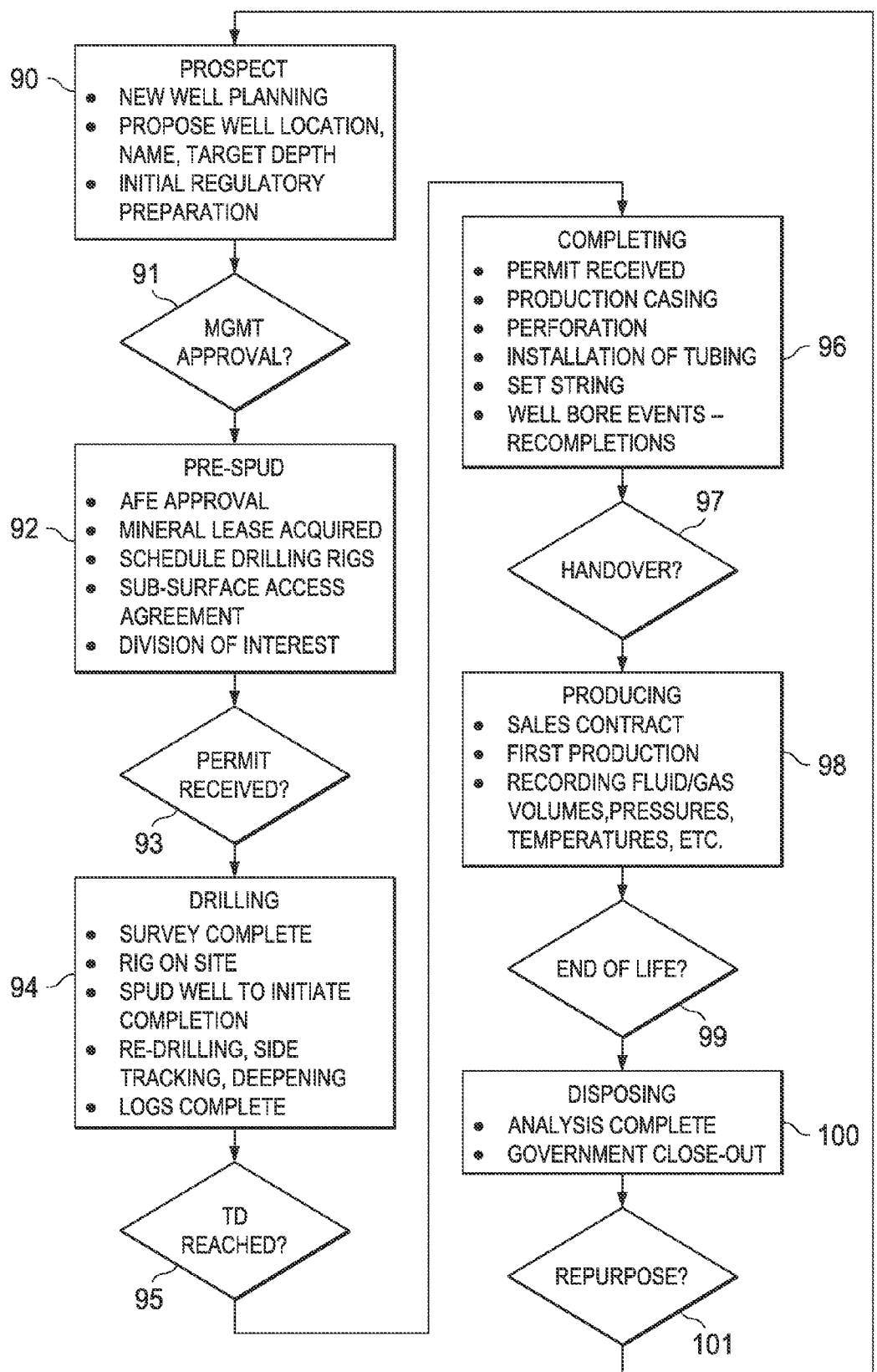
FIG. 10a is a flow diagram illustrating the operation of the information management system and architecture of embodiments of the invention in connection with a workflow management view of the information.

FIG. 10*a* illustrates, more specifically than the generalized business process work flow of FIG. 9, an example of a multiple-phase workflow for "delivery" of an oil and gas well, with the various tasks grouped according to the workflow phase nomenclature promulgated by the Professional Petroleum Data Managers (PPDM) Association. Phase 90 is referred to as the "prospect" phase, and includes such tasks as planning of a new well; proposals for the well location, name, and target depth (TD); and initial regulatory preparation. These tasks within prospect phase 90 may have dependencies among one another, and will be carried out by such functional groups as a sub-surface team, land, and regulatory personnel. Phase trigger 91 in this example is management approval of the well, following which "pre-spud" workflow phase 92 can commence. Pre-spud phase 92 is also carried out by the sub-surface team, land, and regulatory functional personnel groups, and involves such tasks as obtaining AFE approval; acquiring the mineral lease; scheduling drilling rigs; obtaining the necessary sub-surface access agreement; and obtaining agreement to the division of interests in the well. Phase trigger 93 in this example is the obtaining of a permit for the well, following which "drilling" phase 94 can commence, as performed by the drilling team. Drilling phase 94 includes such tasks as completion of the survey; delivery of the rig to the site; spudding the well to initiate completion; re-drilling, side-tracking, and deepening according to the design or as necessary, and completion of logs. Phase trigger 95 in this case occurs upon reaching the target depth (TD), following which "completing" phase 96 is then commenced by the completion team functional group. Completing phase 96 involves the tasks of receiving the appropriate permit; production casing of the borehole; perforation; installation of tubing; setting the string; and other wellbore events such as recompletions. Upon phase trigger 97 corresponding to "handover" of the well by the completion team to the production team, "producing" phase 98 is performed, including the tasks of obtaining the appropriate sales contracts for the well output; the operations involved in attaining first production from the well; and recording fluid and gas volumes, pressures, temperatures, and other information during continued production. Phase trigger 99 occurs at the end of the useful life of the well, either upon plugging of the well or at such time as the well has no further financial impact, following which "disposing" phase 100 begins under the supervision of the wells team functional group completing any additional analysis of the well, and obtaining governmental closeout of the well. If the well is to be repurposed, phase trigger 101 occurs, and the overall multi-phase workflow begins again from prospect phase 90.

As evident from FIG. 10*a*, phases 90 through 100 are interlocked among themselves, with control passing from one phase to another upon the occurrence of a phase trigger 91, 93, . . . 101. Each phase 90 through 100 includes multiple tasks, each "owned" by one or more professionals within one or more functional groups to whom responsibility is assigned for the task. As described above, these tasks within each phase 90 through 100 will often have dependencies among themselves. According to embodiments of this invention, users of the information management system include the "owners" of these various tasks, as well as managers or other personnel involved in the overall workflow or assisting the performance of these tasks. The workflow management tab 60 allows these users to view information and documents regarding the wells and properties in a manner based on these various workflows.

Figure 10B:
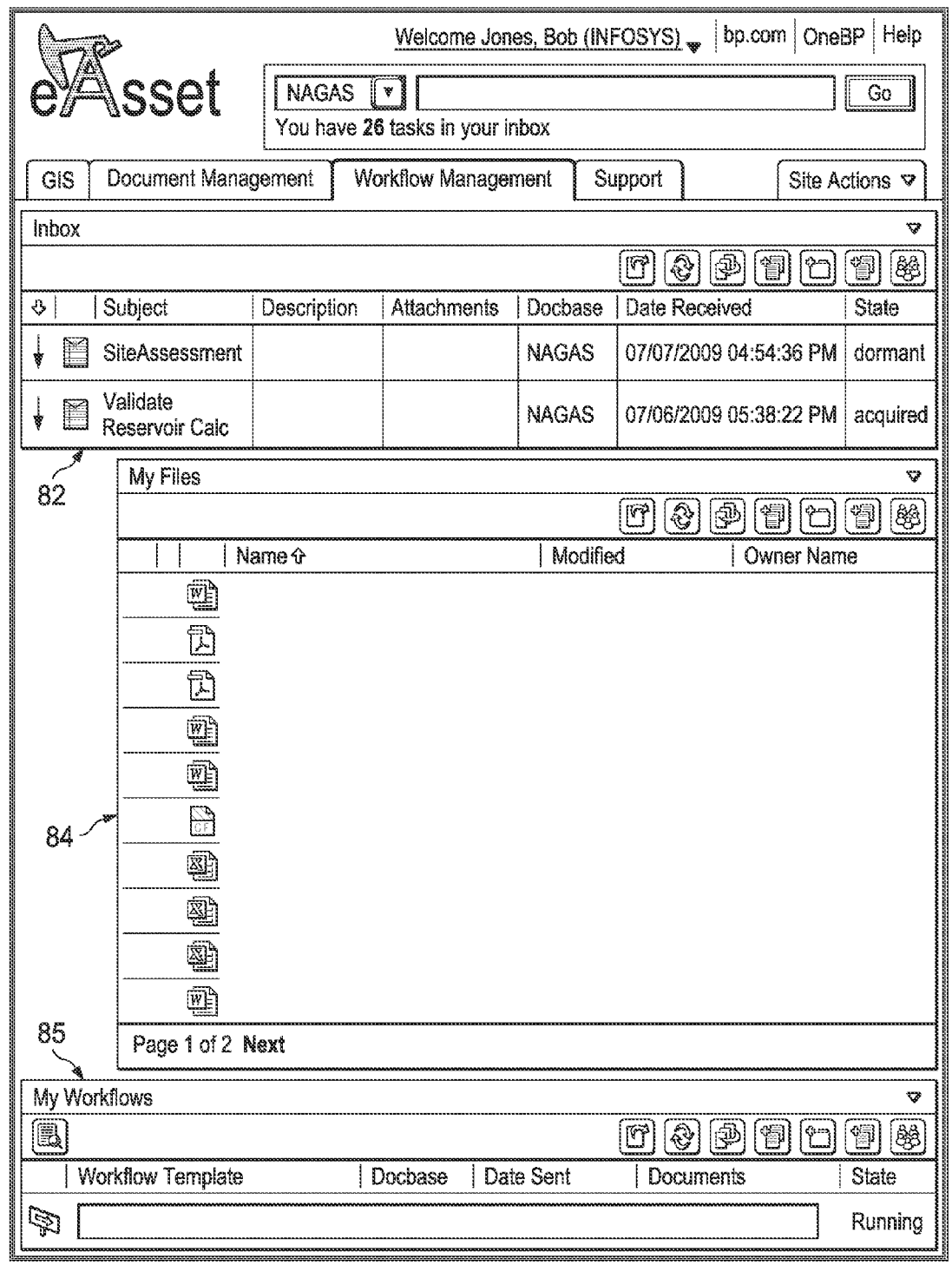
FIG. 10b is a screenshot illustrating an example of the use of the web-based collaboration portal in the information management system and architecture according to a workflow view, according to embodiments of the invention.

FIG. 10*b* illustrates an example of frames from workflow management web site 26, as displayed to the user by web-based collaboration portal 30 upon the user invoking the workflow tab in process 44. "Inbox" frame 82 displays a number of fields representing workflows current activities that are assigned to him or her, for example tasks that are "owned" by that user, or for which inputs are now requested. It is contemplated that the system will cause a workflow to appear within inbox frame 82 for a given user upon completion of a previous task in the workflow by other personnel. For example, referring to FIG. 10*b*, the system displays task "Validate Reservoir Calc" within inbox frame 82 for the current user upon the completion of a previous task for that well, generally by another user of the system. "My Files" frame 84 provides a sortable list of files that have been generated or updated by the current user. "My Workflows" frame 85 displays a list of workflows that the current user initiated or for which the user otherwise has responsibility, including both workflows for which the current user owns a current task (i.e., appearing in "Inbox" frame 82) and also workflows for which other personnel currently own the next task. As mentioned above, workflow management process 80 can call process 54, by way of which the current user may open and view any of the documents shown in frames 82, 84, 85, edit those documents as permitted by the relevant permissions, and upload other relevant documents as appropriate. This workflow-based approach to information management thus provides a task-based and responsibility-based view into the various documents associated with wells and properties.

It is, of course, contemplated that those skilled in the art having reference to this specification will readily recognize variations and alternatives to the various embodiments and implementations described herein. It is contemplated that such variations and alternatives are within the scope of the invention as claimed below.

Figure 1:
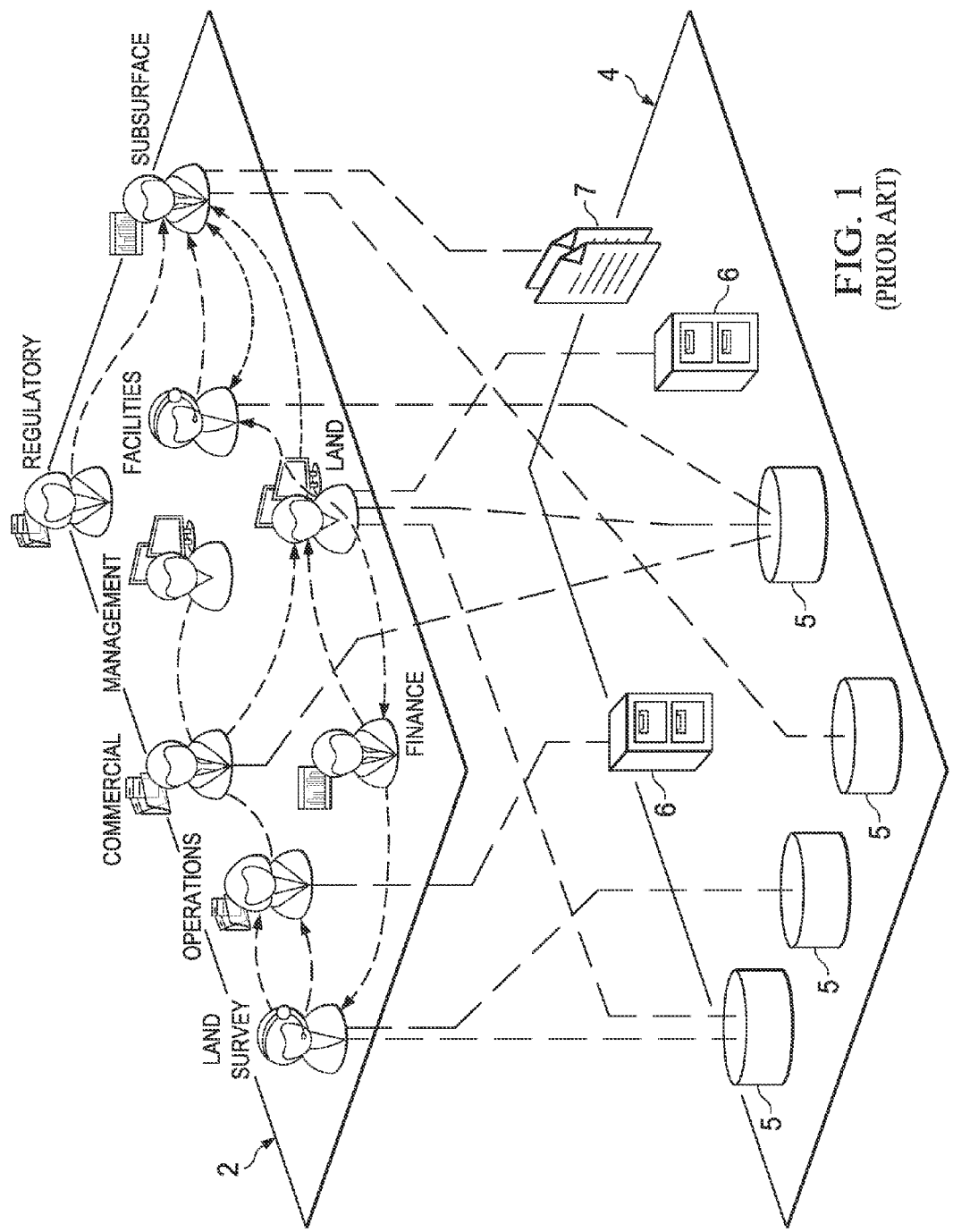
FIG. 1 is a diagram visualizing the interactions among various oil and gas production personnel, and the accessibility of information to those personnel, in conventional information management arrangements.
Figure 11:
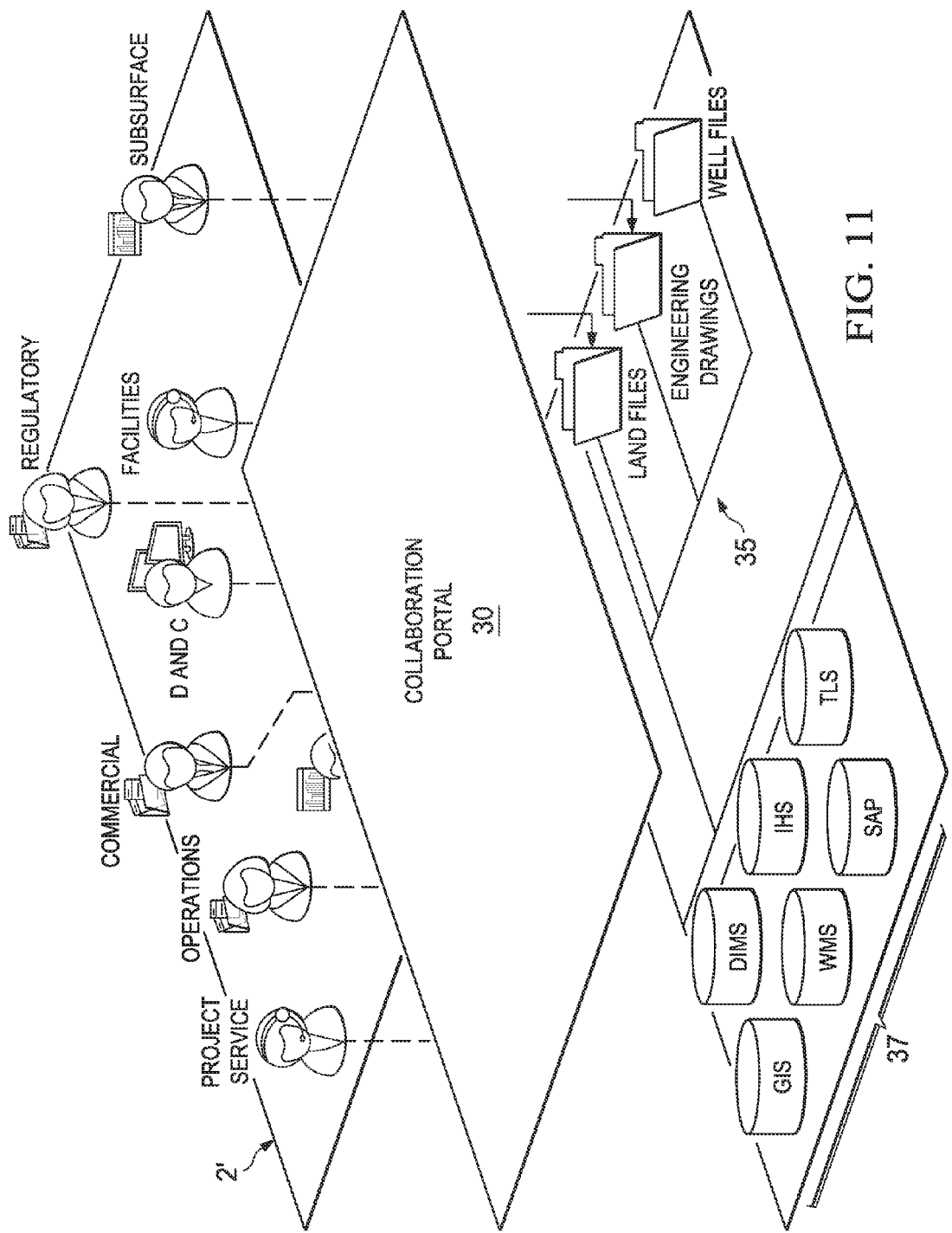
FIG. 11 is a diagram visualizing the interactions among various oil and gas production personnel, and the accessibility of information to those personnel, in the information management system and architecture according to embodiments of the invention.

FIG. 11 illustrates a visualization of the reduced complexity of communications and information access for managing oil and gas exploration and production properties according to the information management system and architecture provided by embodiments of this invention. Plane 2' refers to the interpersonal plane, at which personnel of the operator interact and communicate with one another. As in the case of FIG. 1, these personnel have a wide range of functions, including land survey, operations, commercial, finance, land (i.e., leases and access right-of-ways, etc.), facilities, subsurface, regulatory, and management, and are likely deployed at various locations within the company and perhaps in other companies such as contractors, interact and communicate with one another in rendering decisions regarding exploration and production at the various fields. Plane 104 refers to the information plane, at which information useful to the personnel on plane 2' resides. According to embodiments of this invention, as described above, unstructured data 35 (including GIS data, in this case) and structured data 37 reside on plane 104, but are arranged according to a standardized enterprise-wide repository standard, such that each data source can be located by the system and its users, regardless of whether the particular data source is structured or unstructured. The data on information plane 104 may physically reside at multiple locations, and in various manifestations.

According to embodiments of this invention, collaboration portal 30 operates as a common intermediary plane. Each of the personnel at interpersonal plane 2' are able to access any data item resident on information plane 104, by way of collaboration portal 30. As described above, these data and information can be viewed and accessed using a geographical representation (GIS), using a conventional document management port or interface, or by using a workflow management interface. In addition, the personnel at interpersonal plane 2' are able to collaborate with one another by way of this standardized, common, collaboration portal 30, such that personnel at different locations and in different functional operating groups can simultaneously view the same documents, and sequentially or collaboratively edit and update the relevant information.

Embodiments of this invention thus provide important advantages, relative to conventional oil and gas property information management systems and architectures. According to embodiments of this invention, the access and management of well information is greatly facilitated, regardless of the location or operational assignment of wells and properties. This access includes the locating of pertinent information for a well or property by way of a geographical representation of the earth at which the well or property is located, while still enabling the opening and viewing of actual documents and files. Documents and files pertaining to wells can readily be kept in an "evergreen" state, particularly by way of the workflow management function. Multi-disciplinary collaboration is improved by way of the common collaboration portal. Decision-making is improved in timeliness and accuracy because of the improved availability of the relevant information, and the improved knowledge management enabled by embodiments of this invention. And goodwill of the operator with its contractors and partners, governmental bodies, and the public at large is improved as a result of the improved decision making and information quality.

While the present invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A networked computer system for allowing access to information pertaining to a plurality of hydrocarbon wells located at one or more production properties, comprising:
   at least one server, comprising:
      at least one memory resource for storing files containing data pertaining to the plurality of hydrocarbon wells located at the one or more production properties;
      at least one processor unit coupled to the at least one memory resource; and
      program memory coupled to the one or more central processing units, for storing a plurality of software modules, comprising:
         a geographical information system (GIS) software module, including program instructions that, when executed by one of the processor units, cause the at least one server to access the at least one memory resource to obtain geographical data regarding wells and production properties;
         a document management system software module, including program instructions that, when executed by one of the processor units, cause the at least one server to access data files pertaining to wells and production properties that are stored in the at least one memory resource; and
         a collaboration portal software module, including program instructions that, when executed by one of the processor units, cause the at least one server to display, to one or more system users, a web site at which the system users can access the GIS software module to view a geographical representation of a region of the earth, including one or more wells or production properties, and through which the system users can access a data file associated with a selected one of the wells or production properties; and
   a client workstation for receiving user inputs and for providing output to a user, comprising:
      an interface coupling the at least one workstation to the at least one server;
      an input device for receiving inputs from a system user;
      an output display;
      a processor; and
      program memory, coupled to the one or more central processing units, for storing a client computer program including program instructions that, when executed by the processor, allow the system user to interact with the collaboration portal software module.

2. The system of claim 1, wherein the collaboration portal software module also includes program instructions that, when executed by one of the processor units, cause the at least one server to present, to one or more system users, a first web part by way of which system users can access the GIS software module, and a second web part by way of which system users can access the document management system software module.

3. The system of claim 2, wherein the client computer program includes program instructions that, when executed by the processor, causes the first workstation to receive inputs from the system user by way of the first and second web parts, and to communicate signals corresponding to the received inputs to the at least one server;
   wherein the collaboration portal software module includes program instructions that, when executed by the at least one processor unit, cause the at least one server to communicate data to the at least one workstation that includes geographic information regarding at least one well and at least one production property, and file locations of documents pertaining to the at least one well;

and wherein the client computer program includes program instructions that, when executed by the processor, causes the first workstation to present, at the output display, a geographical representation of the at least one well and at least one production property, in combination with links to the file locations of the documents pertaining to the at least one well.

4. The system of claim 3, wherein the documents pertaining to the at least one well consist of one or more structured data files, and one or more unstructured data files.

5. The system of claim 4, wherein the one or more unstructured data files comprise data files of a type selected from the group consisting of well files, well properties, contracts, leases, and surface agreements.

6. The system of claim 4, wherein the one or more structured data files comprise data files of a type selected from the group consisting of proprietary well data; proprietary well activity data, competitor well data, and proprietary borehole data.

7. The system of claim 3, wherein the collaboration portal software module includes program instructions that, when executed by the at least one processor unit, cause the at least one server to associate the file locations of documents pertaining to the at least one well with the geographic information regarding that well using a key identifier for that well that is common to the geographic information regarding wells and production properties, and to the data files pertaining to wells and production properties that are stored in the at least one memory resource.

8. The system of claim 3, wherein the client computer program includes program instructions that, when executed by the processor, causes the first workstation to present, at the output display, means for selecting one or more layers of geographical information corresponding to a region of the earth including the at least one well and at least one production property.

9. The system of claim 8, wherein the one or more layers of geographical information comprise one or more layers selected from the group consisting of section, township, range, city/town, county, state, bodies of water, rails/roads, well locations, facility location, pipeline network, mineral leases, field outline, well drainage area, topography maps, and aerial photos.

10. The system of claim 2, wherein the collaboration portal software module program instructions that, when executed by the at least one processor unit, cause the at least one server to allow write access to one or more selected documents pertaining to the selected well or production property;

and wherein the client computer program includes program instructions that, when executed by the processor, causes the first workstation to display a selected document pertaining to the selected well or property, and to accept edits to the selected document.

11. The system of claim 2, wherein the collaboration portal software module program instructions that, when executed by the at least one processor unit, cause the at least one server to allow a plurality of users to simultaneously access one or more selected documents pertaining to the selected well or production property.

12. The system of claim 1, wherein the plurality of software modules further comprises:

a workflow management software module, including program instructions that, when executed by one of the processor units, cause the at least one server to access data files pertaining to wells and production properties that are stored in the at least one memory resource and that are associated with a workflow; and wherein the collaboration portal software module also includes program instructions that, when executed by one of the processor units, cause the at least one server to present, to one or more system users, a first web part by way of which system users can access the GIS software module, and a third web part by way of which system users can access the workflow management system software module;

and wherein the client computer program includes program instructions that, when executed by the processor, causes the first workstation to present, at the output display, a first workflow representation including identification of at least one workflow for which the current system user has a responsibility, in combination with links to the file locations of the documents pertaining to the at least one workflow.

13. A method of operating a networked information management system to manage and display documents and files pertaining to oil and gas wells and properties, comprising the steps of:

displaying, at a client workstation, a website interface;

responsive to receiving an input from a system user at the client workstation, via the website interface, invoking a collaboration portal software module program at a web server remote from the client workstation;

then displaying a common interface at the client workstation, including elements by way of which the user can selectively invoke one of a plurality of web parts;

responsive to the user invoking a geographical information system (GIS) web part:

accessing a GIS database storing geographical information regarding a region of the earth;

then displaying, at the client workstation via the website interface, the accessed geographical information from the GIS database regarding the region of the earth, including indicators of the locations of wells or properties in the displayed region of the earth, and one or more links to one or more documents pertaining to the wells or properties; and then responsive to receiving an input from the system user by way of the one or more links, accessing a document data base to obtain information regarding a selected document; and displaying the selected document at the client workstation; and responsive to the user invoking a document management web part:

displaying, at the client workstation via the website interface, a browser frame including links to a plurality of documents arranged by wells and properties; and then responsive to receiving an input from the system user by way of the one or more links, accessing a document data base to obtain information regarding a selected document.

14. The method of claim 13, further comprising:

after the step of invoking the collaboration portal software module program, receiving an authentication request from a system user at the client workstation;

wherein the step of displaying the common interface is performed responsive to the authentication request.

15. The method of claim 13, further comprising:

responsive to the user invoking the GIS web part, displaying, at the client workstation, a menu for allowing the system user to select one or more layers of geographical information corresponding to the region of the earth;

wherein the step of accessing a GIS database comprises obtaining information corresponding to the selected one or more layers of geographical information regarding a region of the earth, responsive to receiving an input from the system user selecting one or more of the layers of geographical information.

16. The method of claim 15, wherein the one or more layers of geographical information comprise one or more layers selected from the group consisting of section, township, range, city/town, county, state, bodies of water, rails/roads, well locations, facility location, pipeline network, mineral leases, field outline, well drainage area, topography maps, and aerial photos.

17. The method of claim 13, wherein the steps of displaying the website interface, displaying the accessed geographical information, and displaying the selected document, are performed simultaneously for a plurality of system users, at a plurality of client workstations.

18. The method of claim 13, further comprising:
responsive to the user at the client workstation invoking a workflow management web part:
accessing a database to obtain information regarding one or more workflows associated with the system user;
displaying, at the client workstation, a first workflow representation including a link to at least one document associated with a workflow for which the current system user has a responsibility;
responsive to receiving an input from the system user by way of the link, accessing a document data base to obtain information regarding the document; and
displaying the document at the client workstation.

19. The method of claim 18, wherein the first workflow representation corresponds to an inbox frame comprising one or more links, each associated with a current task assigned to the system user;
wherein the displaying step further comprises:
displaying a second workflow representation corresponding to a documents frame comprising one or more links, each associated with a document associated with the system user; and
displaying a third workflow representation corresponding to a workflows frame comprising one or more links, each associated with a workflow initiated by the system user.

20. The method of claim 13, wherein the step of invoking the collaboration portal software module program comprises:
displaying the common interface at a plurality of client workstations, so that a plurality of system users can simultaneously access one or more selected documents pertaining to a selected well or production property.

* * * * *